(12) United States Patent
Mochizuki

(10) Patent No.: US 8,715,585 B2
(45) Date of Patent: May 6, 2014

(54) MIXING UNIT, MIXING DEVICE, AGITATION IMPELLER, PUMP MIXER, MIXING SYSTEM AND REACTION DEVICE

(75) Inventor: Noboru Mochizuki, Osaka (JP)

(73) Assignee: Isel Co., Ltd., Osaka (JP)

( * ) Notice: Subject to any disclaimer, the term of this patent is extended or adjusted under 35 U.S.C. 154(b) by 0 days.

(21) Appl. No.: 12/999,102

(22) PCT Filed: Jun. 16, 2009

(86) PCT No.: PCT/JP2009/060922
§ 371 (c)(1),
(2), (4) Date: Dec. 15, 2010

(87) PCT Pub. No.: WO2009/154188
PCT Pub. Date: Dec. 23, 2009

(65) Prior Publication Data
US 2011/0085945 A1   Apr. 14, 2011

(30) Foreign Application Priority Data

Jun. 16, 2008  (JP) ................. 2008-157237
Oct. 22, 2008  (JP) ................. 2008-272394
Feb. 27, 2009  (JP) ................. 2009-045414
Jun. 2, 2009   (JP) ................. 2009-132802

(51) Int. Cl.
*B01J 19/18*   (2006.01)
*B01J 19/00*   (2006.01)
*B01J 8/00*    (2006.01)
*B01F 9/00*    (2006.01)
*B01F 7/00*    (2006.01)
*B01F 5/06*    (2006.01)
*B01F 13/00*   (2006.01)

(52) U.S. Cl.
USPC ........... 422/225; 422/129; 422/224; 422/600; 422/602; 422/606; 366/220; 366/279; 366/315; 366/316; 366/336; 366/340; 366/341

(58) Field of Classification Search
USPC .............. 422/129, 224, 225, 600, 602, 606; 366/241, 262, 270, 279, 316, 336, 340, 366/341, 219, 220; 261/78, 108, 114.1, 261/114.5
See application file for complete search history.

(56) References Cited

U.S. PATENT DOCUMENTS 3,787,189 A * 1/1974 Muffat et al. ............. 422/310
3,856,270 A * 12/1974 Hemker ..................... 366/340
(Continued)

FOREIGN PATENT DOCUMENTS

JP   58-133822       8/1983
JP   59-039173 A     3/1984
(Continued)

OTHER PUBLICATIONS

Machine translation of JP 11-114396 A, which was provided as part of the IDS dated Feb. 14, 2011 and which was published Apr. 27, 1999.*

(Continued)

*Primary Examiner* — Natasha Young
(74) *Attorney, Agent, or Firm* — Osha Liang LLP

(57) ABSTRACT

A mixing unit and various applications of the mixing unit are described herein. The mixing unit includes: a stacked member in which three or more mixing elements are stacked; and a first plate and a second plate between which the stacked member is sandwiched and which are arranged opposite each other. In the mixing unit, the mixing elements have a plurality of first through holes, the second plate has an opening portion communicating with at least one of the first through holes in the mixing elements and the mixing elements are arranged such that part or all of the first through holes in one of the mixing elements communicate with other first through holes in the adjacent mixing element to allow fluid to be passed in a direction in which the mixing elements extend.

24 Claims, 25 Drawing Sheets

(56) References Cited

U.S. PATENT DOCUMENTS

| | | | |
|---|---|---|---|
| 4,514,095 A * | 4/1985 | Ehrfeld et al. | 366/340 |
| 5,108,662 A | 4/1992 | Litz et al. | |
| 5,232,283 A * | 8/1993 | Goebel et al. | 366/336 |
| 5,951,953 A | 9/1999 | Zardi et al. | |
| 6,029,853 A | 2/2000 | Kubo et al. | |
| 6,354,729 B1 | 3/2002 | Brown | |
| 6,379,035 B1 * | 4/2002 | Kubo et al. | 366/340 |
| 6,568,845 B1 * | 5/2003 | Harada | 366/340 |
| 7,842,260 B2 | 11/2010 | Lee et al. | |
| 2004/0135017 A1 | 7/2004 | Sekine | |
| 2005/0254342 A1 | 11/2005 | Cuzin et al. | |
| 2005/0256281 A1 | 11/2005 | Grund et al. | |
| 2006/0004226 A1 * | 1/2006 | Machhammer et al. | 562/526 |
| 2006/0115393 A1 | 6/2006 | Reinke et al. | |
| 2010/0276820 A1 * | 11/2010 | Mogami et al. | 261/74 |

FOREIGN PATENT DOCUMENTS

| | | | |
|---|---|---|---|
| JP | 04-022431 A | | 1/1992 |
| JP | 08-182924 | | 7/1996 |
| JP | 10216495 A * | | 8/1998 |
| JP | 11009980 A * | | 1/1999 |
| JP | 11-057438 A | | 3/1999 |
| JP | 11-114396 | | 4/1999 |
| JP | 2001-518843 A | | 10/2001 |
| JP | 2003-135949 A | | 5/2003 |
| JP | 2003-165708 | | 6/2003 |
| JP | 2007-209862 A | | 8/2007 |

OTHER PUBLICATIONS

Machine translation of JP 11-009980A, which was published Jan. 19, 1999.*

Machine translation of JP 10-216495 A, which was published on Aug. 18, 1998.*

International Preliminary Report on Patentability Mailed Mar. 23, 2011 corresponding to U.S. Appl. No. 12/999,102, filed Dec. 15, 2010.

International Search Report for International Patent Application PCT/JP2009/060922 Mailed on Oct. 6, 2009.

Written Opinion for PCT/JP2009/060922.

International Preliminary Report on Patentability for PCT/JP2009/060922 Mailed Mar. 10, 2011.

"Super Shear Mixers" article, published Jun. 2, 2010, and translation thereof.

* cited by examiner

MIXING UNIT, MIXING DEVICE, AGITATION IMPELLER, PUMP MIXER, MIXING SYSTEM AND REACTION DEVICE

TECHNICAL FIELD

The present invention relates to a product that is applied as a mixing unit or a mixing device and is thus utilized to perform processing such as for statistically mixing fluid. The invention also relates to a product that is applied as an agitation impeller, a pump mixer or a mixing system and is thus utilized to perform processing such as for dynamically mixing fluid. The invention also relates to a product that is applied as a reaction device and is thus utilized to perform processing such as for efficiently mixing fluid to produce reaction.

BACKGROUND ART

As a static mixing device for mixing fluid, a Kenics-type static mixer or the like is widely used. Since this type of static mixer generally does not include a movable component, the static mixing device is widely used in fields, such as the chemical industry and the food industry, in which fluid is required to be mixed in piping. On the other hand, as a dynamic mixing device, a product is widely used that places an agitation impeller in fluid within a mixing vessel and that rotates the agitation blade to mix the fluid.

Patent document 1 discloses an example of a static fluid mixing device. This fluid mixing device is provided with a distribution port in the middle, and is composed of a plurality of fluid guide units obtained by concentrically stacking two discs, that is, one large disc and one small disc formed by arranging in one surface a large number of polygonal-shaped compartments whose front surfaces are open, in the form of honeycomb. The compartments of the large diameter disc and the compartments of the small diameter disc are arranged in different positions such that each compartment communicates with a plurality of compartments opposite it, and these fluid guide units are stacked.

In the fluid mixing device, when the fluid moves through the compartments in the fluid guide units, the fluid is mixed by being dispersed, reversed and combined, and is further mixed by eddying flow, turbulent flow, collision and the like produced in each compartment. The fluid mixing device is characterized in that significant mixing effects are obtained by alternately dispersing and concentrating the fluid in a radial direction, that is, from the center of the fluid guide unit to the outside or from the outside to the center.

However, since, in the fluid mixing device, the area of a fluid flow passage is composed of the areas of only parts through which the compartments of the two discs, the large and small discs, communicate with each other, the mixing effects are limited. As the flow rate of the fluid is increased, the pressure drop produced in the entire device is increased; thus, it is disadvantageously necessary to use a large amount of power.

Since the residues of the fluid and foreign matter are adhered to dead spaces in the compartments, a washing operation for maintenance is time-consuming.

On the other hand, in order to mix liquid within a mixing vessel, a turbine blade or the like is widely used; patent document 2 discloses an agitation blade to increase the efficiency of mixing. In the agitation blade, on both surfaces of a supporting member fitted to an agitation shaft, four pairs of two partially agitating units are fitted, each pair of two partially agitating units being aligned with respect to the rotational plane on each surface; as the outside openings of the partially agitating units of those pairs are positioned further backward with respect to the rotational direction, they are sequentially positioned further backward toward the inside. Consequently, a large degree of mixing is easily and reliably acquired in a short period of time even with a small amount of power.

However, in the agitation blade described above, the fluid is mixed only in the areas around the partially agitating units fitted to the supporting member, and the efficiency of mixing is therefore limited.

In order to mix fluid within a reaction device or a reactor to produce reaction, for example, a methanol synthesis reactor is provided that involves a heterogeneous exothermic reaction. In the reactor, raw gas is reacted with a catalyst, catalyst layers are divided into several parts so that the amount of catalyst put into the reactor is reduced, the gas entering the catalyst layers is cooled and the concentration of a reaction product within the gas is reduced, with the result that the reaction rate in the catalyst layers is increased. Specifically, the outgoing gas in the catalyst layers whose temperature is high due to the exothermic reaction is mixed with the raw gas whose temperature is low and thus the temperature of the outgoing gas and the concentration of methanol, that is, the reaction product are reduced, and they are fed to downstream catalyst layers. In this way, it is possible to increase the reaction speed and the reaction rate in the catalyst layers and thus reduce the total amount of catalyst put into the reactor.

Patent document 3 discloses an example of such a mixing device and a reactor in which gas flows having different temperatures are mixed within a heterogeneous exothermic synthesis reactor. The mixing device is provided within the reactor; the mixing device mixes a high-temperature gas flow from an annular space formed by a partition that is placed parallel to a side wall of the reactor supporting catalyst layers and in a lower part of the bottom of a catalyst bed with a cooling gas flow supplied from an annular pierced supply portion placed in a lower part of the partition under predetermined conditions. In this way, it is possible to optimally mix gas flows having different temperatures and thus improve an inversion rate within the reactor.

However, when mixing is performed by the mixing device, since the cooling gas flow is locally injected into the high-temperature gas flow through the pierced supply portion placed in the annular space, the gases are insufficiently mixed around the pierced supply portion. Hence, in order to sufficiently mix the gases as a whole, a predetermined space is further required. Therefore, a deflector is provided to improve the mixing effects but the mixing effects are limited. Moreover, when an operation is performed with a small amount of gas flow supplied to the reactor and a light load thus imposed on the reactor, since the speed of the cooling gas flow supplied through the holes in the pierced supply portion is reduced, the effects of mixture with the high-temperature gas flow are disadvantageously further reduced. Furthermore, the pierced supply portion for supplying the cooling gas flow is placed in the annular space, and it therefore becomes difficult to produce the annular space as the size of the reactor is increased.

RELATED ART DOCUMENT

Patent Document

Patent document 1: Japanese Unexamined Patent Application Publication No. S58-133822
Patent document 2: Japanese Unexamined Patent Application Publication No. H8-182924

Patent document 3: Japanese Unexamined Patent Application Publication (Translation of PCT Application) No. H9-509611

SUMMARY OF THE INVENTION

Problems to be Solved by the Invention

The present invention is designed in view of the foregoing; an object of the present invention is to provide a mixing unit and a mixing device which have significant mixing effects in a small space, which can mix a large amount of fluid and in which a washing operation can easily be performed. Another object of the present invention is to provide an agitation impeller and a pump mixer that use the mixing unit to have significant mixing effects in a small space. Yet another object of the present invention is to provide a mixing system that uses the pump mixer. Still another object of the present invention is to provide a reaction device that uses the mixing unit to efficiently mix and react fluid.

Means for Solving the Problem

To achieve the above objects, the present invention provides a mixing unit, a mixing device, an agitation impeller, a pump mixer, a mixing system and a reaction device below.

A mixing unit according to the present invention includes: a stacked member in which a plurality of mixing elements are stacked; and a first plate and a second plate between which the stacked member is sandwiched and which are arranged opposite each other. In the mixing unit, the mixing elements have a plurality of first through holes, the second plate has an opening portion communicating with at least one of the first through holes in the mixing elements and the mixing elements are arranged such that part or all of the first through holes in one of the mixing elements communicate with a first through hole in the adjacent mixing element to allow fluid to be passed in a direction in which the mixing element extends.

According to the present invention, the fluid that flowed in through the second opening portion in the second plate flows into the stacked member through the first through holes in the mixing elements communicating with the opening portion, is mixed while being passed through the first through holes communicating with each other within the stacked member and flows out of the stacked member.

The first through holes in the mixing elements on both ends of the stacked member in the direction in which the mixing elements are stacked are closed by the first plate and the second plate. Therefore, the fluid that has flowed into the stacked member is so guided as to be passed through the first through holes communicating with each other in the direction in which the mixing element extends.

Even when, in contrast, the fluid that has flowed into the stacked member through the first through holes in the mixing elements flows out through the opening portion in the second plate, the fluid is mixed while being passed through the first through holes communicating with each other within the stacked member.

Here, the direction in which the mixing element extends refers to the direction perpendicular to the direction in which the mixing elements are stacked.

Furthermore, according to this configuration, the fluid flows out from the above-mentioned first through holes to other first through holes communicating with each other in the mixing direction, and, in contrast, the fluid flows in from those other first through holes communicating with each other in the mixing direction to the above-mentioned first through holes, with the result that the fluid repeatedly flows in and out within the first through holes complicatedly communicating with each other. Thus, the fluid flows more complicatedly, and this enhances the mixing effects. Since a larger number of mixing elements stacked are used and hence a cross-sectional area in the direction in which the mixing elements having the fluid flow extend is increased, it is possible to mix a larger amount of fluid.

In the mixing unit according to the present invention, the plurality of mixing elements, the first plate and the second plate are preferably fixed such that the mixing unit can be disassembled into each of the plurality of mixing elements, the first plate and the second plate.

According to this configuration, the mixing unit is disassembled into the mixing elements, the first plate and the second plate, and thus it is possible to easily produce the mixing unit. Moreover, a cleaning operation such as for removing residue and foreign matter left in the first through holes in the mixing elements can easily be performed.

In the mixing unit according to the present invention, the plurality of mixing elements, the first plate and the second plate are preferably fixed such that each of the plurality of mixing elements, the first plate and the second plate can be individually divided.

According to this configuration, the plurality of mixing elements, the first plate and the second plate, which constitute the mixing unit, can be divided. Thus, it is possible to easily provide the mixing unit in a product having a complicated shape.

Preferably, in the mixing unit according to the present invention, the mixing elements have a second through hole larger than the first through holes and are arranged such that the second through hole communicate with each other in a direction in which the mixing elements are stacked so as to form a hollow portion in the stacked member, and the opening portion in the second plate communicates with at least one of the first through holes in the mixing elements through the hollow portion.

According to this configuration, the fluid that has flowed through the opening portion in the second plate flows into the hollow portion of the mixing unit. Here, the hollow portion refers to a hollow space portion formed by stacking the second through holes in the mixing elements. Since the flow resistance of the fluid flowing through the hollow portion is low, the distribution of pressure in the mixing direction is low. Hence, the fluid flows, regardless of the position of the mixing direction, into the stacked member through the first through holes substantially uniformly communicating with the hollow portion, and flows in the direction in which the mixing elements extend.

Even when, in contrast, the fluid that has flowed into the stacked member through the first through holes of the mixing elements flows out into the hollow portion, the fluid substantially uniformly flows, regardless of the position of the mixing direction, through the stacked member in the direction in which the mixing elements extend, and flows out through the first through holes substantially uniformly communicating with the hollow portion.

A mixing device according to the present invention includes: the mixing unit described above; and a casing that accommodates the mixing unit and that has an inlet and an outlet. In the mixing unit, the first plate of the mixing unit has an outer shape smaller than an inner shape of the casing, the second plate of the mixing unit has an outer shape substantially equal to the inner shape of the casing and an outer surface of the second plate is substantially in contact with an inner surface of the casing.

According to this configuration, the fluid that has flowed in through the inlet of the casing flows into the stacked member through the opening portion of the second plate and the first through holes in the mixing elements communicating with the opening portion of the second plate. Then, the fluid is mixed while being passed through the first through holes communicating with the inside of the stacked member, flows out of the stacked member and further flows out through the outlet of the casing.

When, in contrast, the fluid within the stacked member flows out through the opening portion of the second plate, the fluid flows into the stacked member through the first through holes of the mixing elements. Then, the fluid is mixed while being passed through the first through holes communicating with the inside of the stacked member, flows out through the first through holes communicating with the opening portion of the second plate and further flows out through the outlet of the casing.

Since the first plate of the mixing unit has the outer shape smaller than the inner shape of the casing, the fluid is not prevented from flowing into the stacked member. Moreover, since the outer surface of the second plate is substantially in contact with the inner surface of the casing, it is possible to reliably pass the fluid through the opening portion of the second plate into the stacked member.

According to this configuration, the fluid repeatedly flows in and out in the first through holes complicatedly communicating with each other within the stacked member forming the mixing unit. Thus, the fluid flows more complicatedly, and this enhances the mixing effects. Since a larger number of mixing elements that are stacked and form the mixing unit are used and thus a cross-sectional area in the direction in which the mixing elements having the fluid flow extend is increased, it is possible to mix the fluid having a larger flow rate.

Furthermore, according to this configuration, since the fluid can be mixed within the casing, it is possible to use the mixing device as an in-line static mixing device. Thus, it is possible to continuously mix the fluid.

An agitation impeller according to the present invention has the mixing unit fitted to a rotation shaft that is driven to rotate.

According to this configuration, when the agitation impeller is provided within a mixing vessel, the rotation of the rotation shaft rotates the mixing unit, a centrifugal force acts on the fluid within the mixing unit and the fluid is mixed while being passed through the first through holes communicating with each other and is discharged through the first through holes open to the outer circumferential portion of the stacked member. The fluid within the mixing vessel is sucked into the hollow portion by the rotation of the mixing unit, is passed through the first through holes communicating with the hollow portion into the stacked member and is mixed.

With a conventional paddle blade or a disc turbine blade, mixing energy is mainly applied to the fluid in only a small space near the blade; however, according to this configuration, the volume ratio of the mixing unit to the mixing vessel is increased, and thus the mixing energy is applied to the fluid in a significantly large space as compared with the conventional agitation blade. It is therefore possible to effectively utilize the space within the mixing vessel and effectively mix the fluid.

A pump mixer according to the present invention has the mixing unit provided within a casing. In the pump mixer, the mixing unit is driven to rotate such that fluid sucked through a suction port provided in the end surface of the casing is passed into the mixing unit through the opening portion of the second plate of and the hollow portion of the mixing unit, is further passed out through the outer circumferential portion of the mixing unit and is discharged through a discharge port provided in the casing.

According to this configuration, the fluid sucked through the suction port of the casing flows into the hollow portion of the mixing unit that is driven to rotate. The fluid that has flowed into the hollow portion flows into the stacked member forming the mixing unit through the first through holes of the mixing elements communicating with the hollow portion, and is passed through the first through holes communicating with the inside of the stacked member. Thereafter, the fluid flows out through the outer circumferential portion of the mixing unit, and is discharged through the discharge port of the casing.

In this configuration, the fluid repeatedly flows in and out in the first through holes complicatedly communicating with each other within the stacked member forming the mixing unit. Thus, the fluid flows more complicatedly, and this enhances the mixing effects.

Since a larger number of mixing elements stacked are used and thus a cross-sectional area in the direction in which the mixing elements having the fluid flow extend is increased, it is possible to mix the fluid having a larger flow rate.

Furthermore, according to this configuration, since the mixing unit is driven to rotate and thus the fluid sucked through the suction port can be mixed within the pump mixer and discharged at high pressure, it is possible to continuously mix the fluid in a line.

Preferably, in the pump mixer according to the present invention, blades are provided in the outer circumferential portion of the stacked element, and the blades are formed to face in a direction substantially perpendicular to the direction in which the mixing element extends.

According to this configuration, for example, with the blade formed in the outer circumferential portion of the stacked element, it is possible to effectively apply a force to the fluid passed out through the outer circumferential portion of the stacked member. It is therefore possible to increase the pressure of the fluid discharged from the pump mixer.

A mixing system according to the present invention is a mixing system that includes the pump mixer and that further includes a fluid circulation line extending from the discharge port to the suction port of the pump mixer.

Since this mixing system includes the pump mixer in the fluid circulation line, even when the fluid cannot be mixed sufficiently by passing the fluid through the pump mixer only one time, it is possible to repeatedly pass the fluid through the pump mixer. It is therefore possible to reliably mix the fluid.

A reaction device according to the present invention is a reaction device in which the mixing unit is provided within a vessel having an inlet and an outlet, and in which at least two catalyst layers are provided within the vessel and the mixing unit is provided in at least one space between the catalyst layers.

In this reaction device, the mixing unit is provided in at least one space between the catalyst layers among at least two catalyst layers within the reaction device, and the fluid from the upstream catalyst layer is fed to the mixing unit provided between the catalyst layers along with one or two or more other fluids. The fluid fed to the mixing unit flows through the opening portion of the second plate of the mixing unit and the first through holes of the mixing elements communicating with the opening portion of the second plate into the stacked member. Then, the fluid is mixed while being passed through the first through holes communicating with the inside of the stacked element, flows out of the mixing unit and is fed to the downstream catalyst layer.

Since, in this configuration, the first plate has the outer shape smaller than the inner shape of the vessel, it is possible to reliably flow the fluid out of or into the space around the stacked member. Since the outer surface of the second plate is substantially in contact with the inner surface of the vessel, it is possible to reliably flow the fluid into or out of the stacked member through the opening portion of the second plate.

In this configuration, the fluid repeatedly flows in and out in the first through holes complicatedly communicating with each other within the stacked member of the mixing unit, is highly mixed and is fed to the downstream catalyst layer. Thus, the conversion in the catalyst layer is increased.

Since a larger number of mixing elements that are stacked and form the mixing unit are used and thus a cross-sectional area in the direction in which the mixing elements having the fluid flow extend is increased, it is possible to mix and react the fluid having a larger flow rate.

A reaction device according to the present invention is a reaction device in which a mixing unit for mixing fluid within a vessel is provided. In the reaction device, at least two catalyst layers are provided within the vessel, the mixing unit is provided in at least one space between the catalyst layers, the mixing unit includes a stacked member in which a plurality of mixing elements are stacked and cover plates between which the stacked member is sandwiched and which are arranged opposite each other, the mixing elements have a plurality of first through holes, the mixing elements are arranged such that part or all of the first through holes in one of the mixing elements communicate with a first through hole in the adjacent mixing element to allow fluid to be passed in a direction in which the mixing element extends, and part of a side surface of the stacked member is covered such that the mixing unit has a fluid inlet and a fluid outlet in the direction in which the mixing element extends.

According to this configuration, since the cover plates between which the stacked member formed with a plurality of mixing elements is sandwiched are arranged opposite each other and part of the side surface of the stacked member is covered, the mixing unit has the fluid inlet and the fluid outlet in the direction in which the mixing element extends. Hence, the fluid that has flowed in through the inlet is mixed while being passed through the first through holes communicating with the inside of the stacked member, and flows out of the stacked member.

The first through holes in the mixing elements on both ends of the stacked member in the direction in which the mixing elements are stacked are closed by the cover plates. Therefore, the fluid that has flowed into the stacked member is so guided as to be passed through the first through holes communicating with each other in the direction in which the mixing element extends.

Here, the direction in which the mixing element extends refers to the direction perpendicular to the direction in which the mixing elements are stacked.

Furthermore, according to this configuration, the fluid flows out from the above-mentioned first through holes to other first through holes communicating with each other in the mixing direction, and, in contrast, the fluid flows in from those other first through holes communicating with each other in the mixing direction to the above-mentioned first through holes, with the result that the fluid repeatedly flows in and out within the first through holes complicatedly communicating with each other. Thus, the fluid flows more complicatedly, and this enhances the mixing effects. Since a larger number of mixing elements stacked are used and hence a cross-sectional area in the direction in which the mixing elements having the fluid flow extend is increased, it is possible to mix the fluid having a larger flow rate.

Effects of the Invention

As described above, according to the mixing unit and the mixing device of the present invention, the fluid flows through the first through holes communicating with each other, and thus the mixing effects are enhanced.

Moreover, according the agitation impeller of the present invention, the fluid flows through the first through holes communicating with each other, and thus it is possible to effectively mix the fluid.

Furthermore, according to the pump mixer of the present invention, since the fluid sacked through the suction port of the pump mixer is passed through the first through holes communicating with each other within the stacked member of the mixing unit and is discharged through the discharge port, it is possible to-continuously mix the fluid. It is also possible to discharge the fluid sucked through the suction port of the pump mixer through the discharge port at high pressure. Moreover, according to the mixing system of the present invention, since the fluid can be repeatedly passed through the pump mixer, it is possible to reliably mix the fluid.

Furthermore, according to the reaction device of the present invention, since the fluid is passed through the first through holes communicating with the inside of the stacked member of the mixing unit, the effect of mixing the fluid is enhanced, and thus it is possible to increase a conversion in the downstream catalyst layer.

BRIEF DESCRIPTION OF DRAWINGS

FIG. 12 A cross-sectional view showing how fluid flows through a pump mixer according to a second embodiment of the pump mixer.

BEST MODE FOR CARRYING OUT THE INVENTION

First Embodiment of a Mixing Unit

Figure 1:
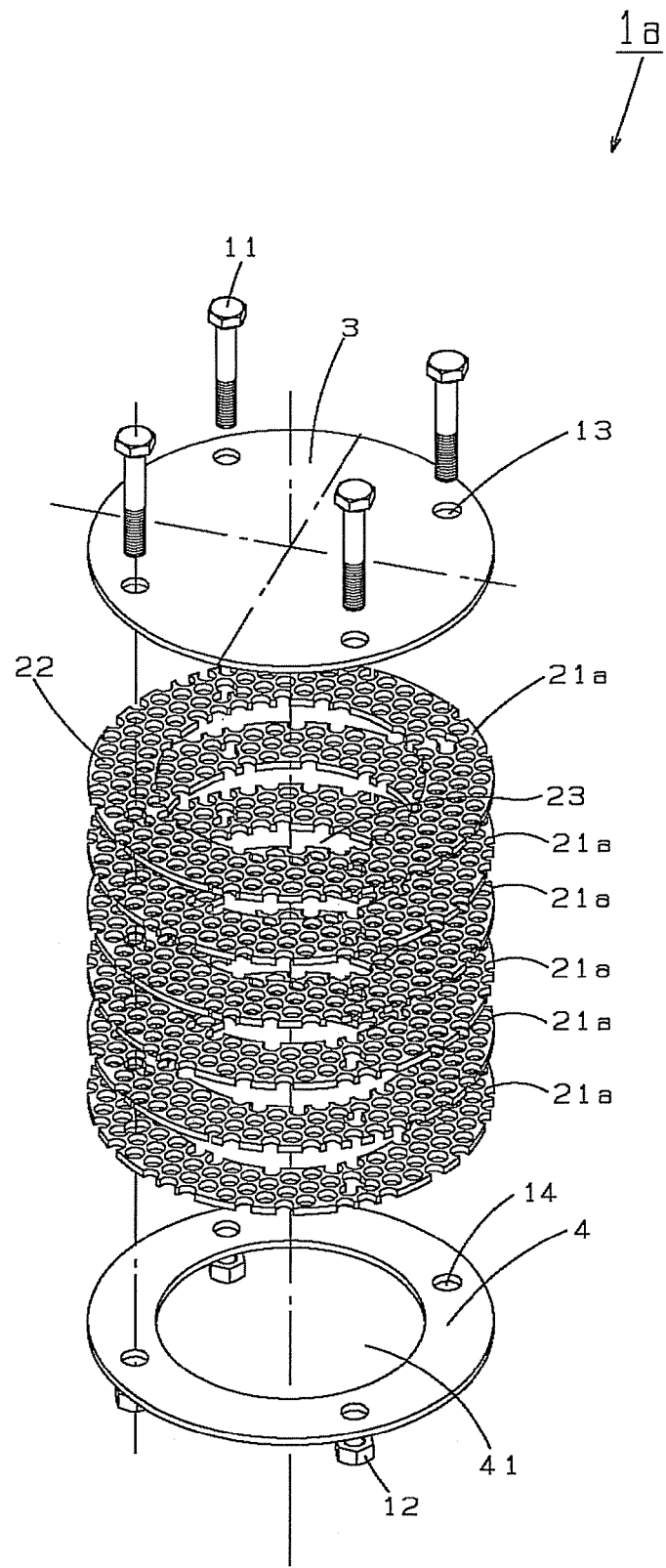
FIG. 1 A perspective view showing the constituent components of a mixing unit according to a first embodiment of the mixing unit.
Figure 2A:
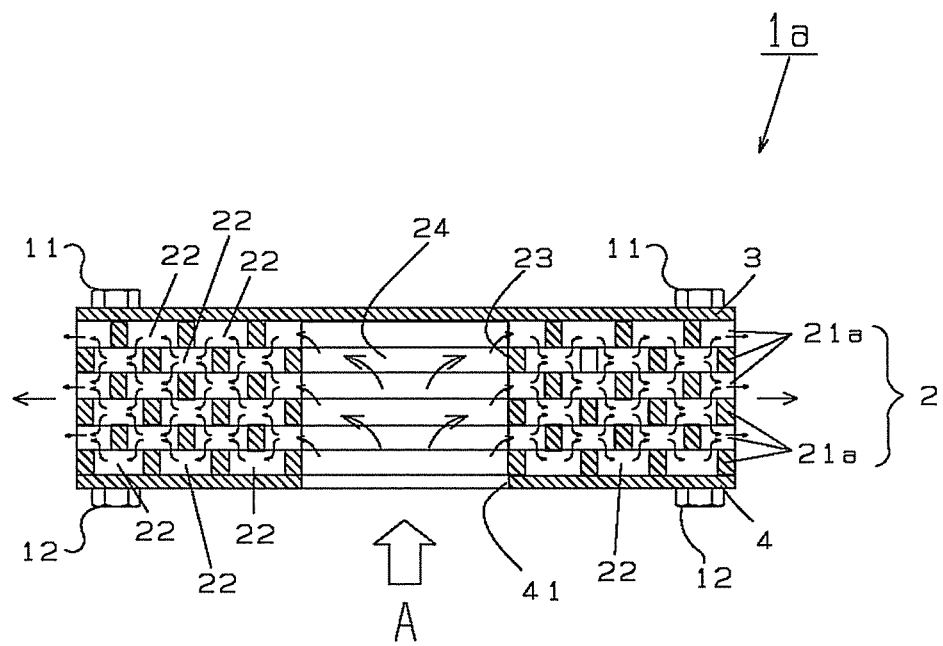
FIG. 2 A cross-sectional view showing how fluid flows through the mixing unit according to the first embodiment of the mixing unit, and a plan view showing the stacked state of mixing elements.
Figure 2B:
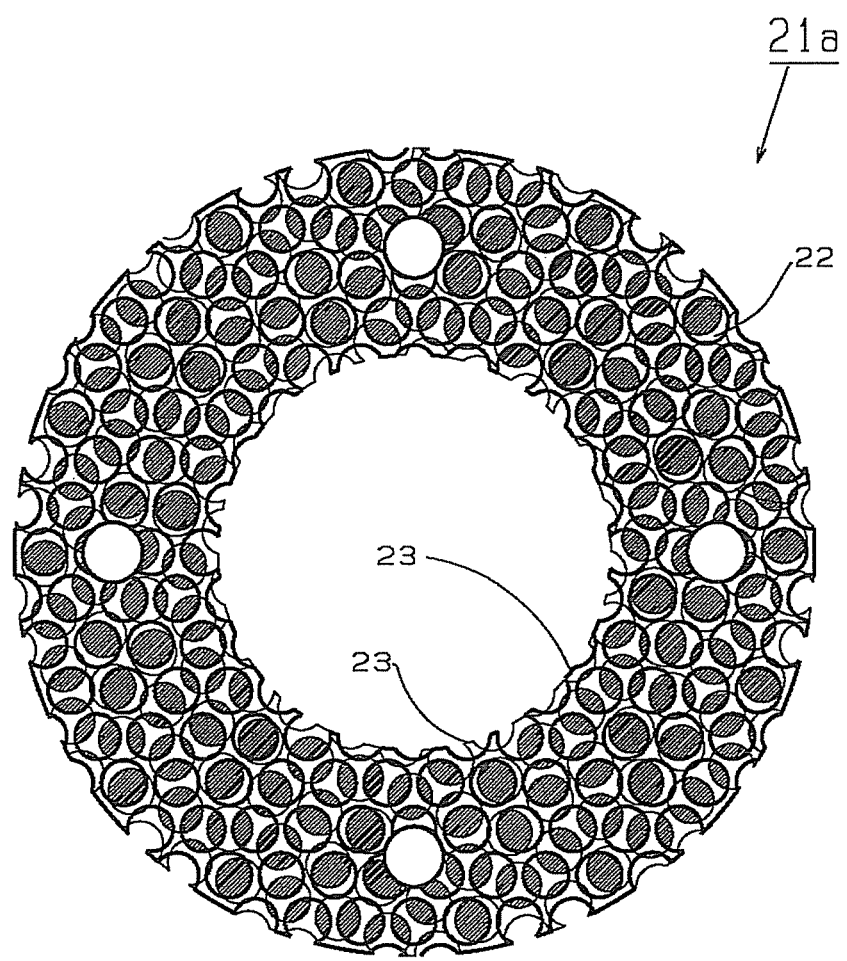

FIG. 1 is a perspective view showing the constituent components of a mixing unit 1a according to a first embodiment. FIG. 2(a) is a cross-sectional view showing how a fluid A flows through the mixing unit 1a; FIG. 2(b) is a plan view showing the stacked state of first through holes 22 when a mixing element 21a is placed on the adjacent mixing element 21a.

As shown in FIGS. 1 and 2, the mixing unit 1a is configured by sandwiching a stacked member 2, in which a plurality of disc-shaped mixing elements 21a (here, six mixing elements) are stacked, between a first plate 3 and a second plate 4 with, for example, fixed by four bolts 11 and nuts 12 appropriately arranged.

The first plate 3 is a disc having only holes 13 for the bolts. The second plate 4 has the holes 14 for the bolts and a circular opening portion 41 in the middle through which the fluid A flows. The first plate 3 and the second plate 4 are substantially equal in outside diameter to the mixing element 21a.

The mixing element 21a has a plurality of circular first through holes 22 and a substantially circular second through hole 23 in the middle. The second through hole 23 is substantially equal in inside diameter to the opening portion 41, and is substantially concentric with the opening portion 41 in the second plate 4. The mixing elements 21a are stacked, and thus the second through holes 23 form a hollow portion 24.

The first through holes 22 have substantially the same inside diameter and pitch. As shown in FIG. 2(b), part of a plurality of first through holes 22 is so arranged as to be displaced with respect to the first through holes 22 in the adjacent mixing elements 21a and to overlap them, and communicates in the direction in which the mixing element 21a extends. The part of a plurality of first through holes 22 is open to the inner circumferential surface and the outer circumferential surface of the mixing elements 21a.

The first through holes 22 in the mixing elements 21a on both ends of the stacked member 2 are closed, in the direction in which the mixing elements 21a are stacked, by the first plate 3 and the second plate 4 arranged opposite each other on both ends of the stacked member 2. Hence, the fluid A within the stacked member 2 is prevented from flowing through the first through holes 22 in the mixing elements 21a on both ends of the stacked member 2 in the direction in which the mixing elements 21a are stacked, and is reliably passed within the stacked member 2 in the direction in which the mixing element 21a extends.

Therefore, the fluid A is passed within the mixing unit 1a from the inner circumferential portion to the outer circumferential portion or vise verse, that is, from the outer circumferential portion to the inner circumferential portion. As described above, a plurality of first through holes 22 are formed to communicate with each other such that the fluid A can be passed between the first through holes 22 in the direction in which the mixing element 21a extends.

In the mixing unit 1a described above, for example, the fluid A flows through the opening portion 41 of the second plate 4 into the hollow portion 24 with appropriate pressure. Then, the fluid A flows into the stacked member 2 through the first through holes 22 in the mixing elements 21a, which are open to the inner circumferential surface of the hollow portion 24. Then, the fluid A is passed to other first through holes 22 that communicate with the above-mentioned first through holes 22, and is further passed to first through holes 22 that communicate with the above-mentioned other first through holes 22. Finally, the fluid A flows out of the stacked member 2 through the first through holes 22 in the mixing elements 21a, which are open to the outer circumferential surface of the stacked member 2.

As described above, the fluid A substantially radially flows through the first through holes 22 communicating with each other within the stacked member 2 from the inner circumferential portion to the outer circumferential portion. Here, the fluid A is repeatedly divided, combined, reversed and subjected to turbulent flow, eddying flow, collision and the like, and thus the fluid A is highly mixed. On the contrary, the fluid A may flow in through the outer circumferential portion of the stacked member 2 of the mixing elements 21a and flow out through the inner circumferential portion.

The hollow portion 24 is sufficiently larger in size than the first through holes 22; the second through holes 23 of the mixing elements 21a constituting the hollow portion 24 are substantially equal in inside diameter to each other, and are substantially concentric with each other. Hence, the flow resistance to the fluid A flowing through the hollow portion 24 is smaller than that of the fluid A flowing through the stacked member 2. Likewise, the pressure drop is smaller. Therefore, even when a large number of mixing elements 21a are stacked, the fluid A substantially uniformly reaches the inner circumferential portion of the mixing elements 21a regardless of the position of the mixing direction, and substantially uniformly flows through the stacked member 2 from the inner circumferential portion to the outer circumferential portion.

In first through holes 22 in the mixing element 21a whose upper surface and lower surface are in contact with other mixing elements 21a within the mixing unit 1a, since the fluid A flows out from the above-mentioned first through holes 22 to the above-mentioned other first through holes 22 on the upper and lower surfaces, the fluid A is divided through the above-mentioned other first through holes 22 on the upper and lower surfaces. Moreover, since the fluid A flows in from the above-mentioned other first through holes 22 on the upper and lower surfaces to the above-mentioned first through holes 22, the fluid A from the above-mentioned other first through holes 22 on the upper and lower surfaces is combined. Therefore, significant mixing effects are acquired and the fluid A is highly mixed.

In particular, when the flow rate is increased and thus the flow state is transferred to the turbulent flow, the effects of the turbulent flow and the eddying flow are increased, and thus the mixing effects of the fluid resulting from the scattering and the combination are further increased. Even when the flow rate is low and thus the flow state is at a laminar flow, the fluid is divided toward the upper and lower surfaces and is combined, and thus the fluid is highly mixed.

Since the mixing element 21a, the first plate 3 and the second plate 4 can be separately produced, the mixing unit 1a can be produced easily and inexpensively.

Furthermore, since the mixing element 21a, the first plate 3 and the second plate 4 can be disassembled, a cleaning operation such as for removing residue and foreign matter left in the first through holes 22 in the mixing elements 21a can easily be performed.

Second Embodiment of the Mixing Unit

Figure 3:
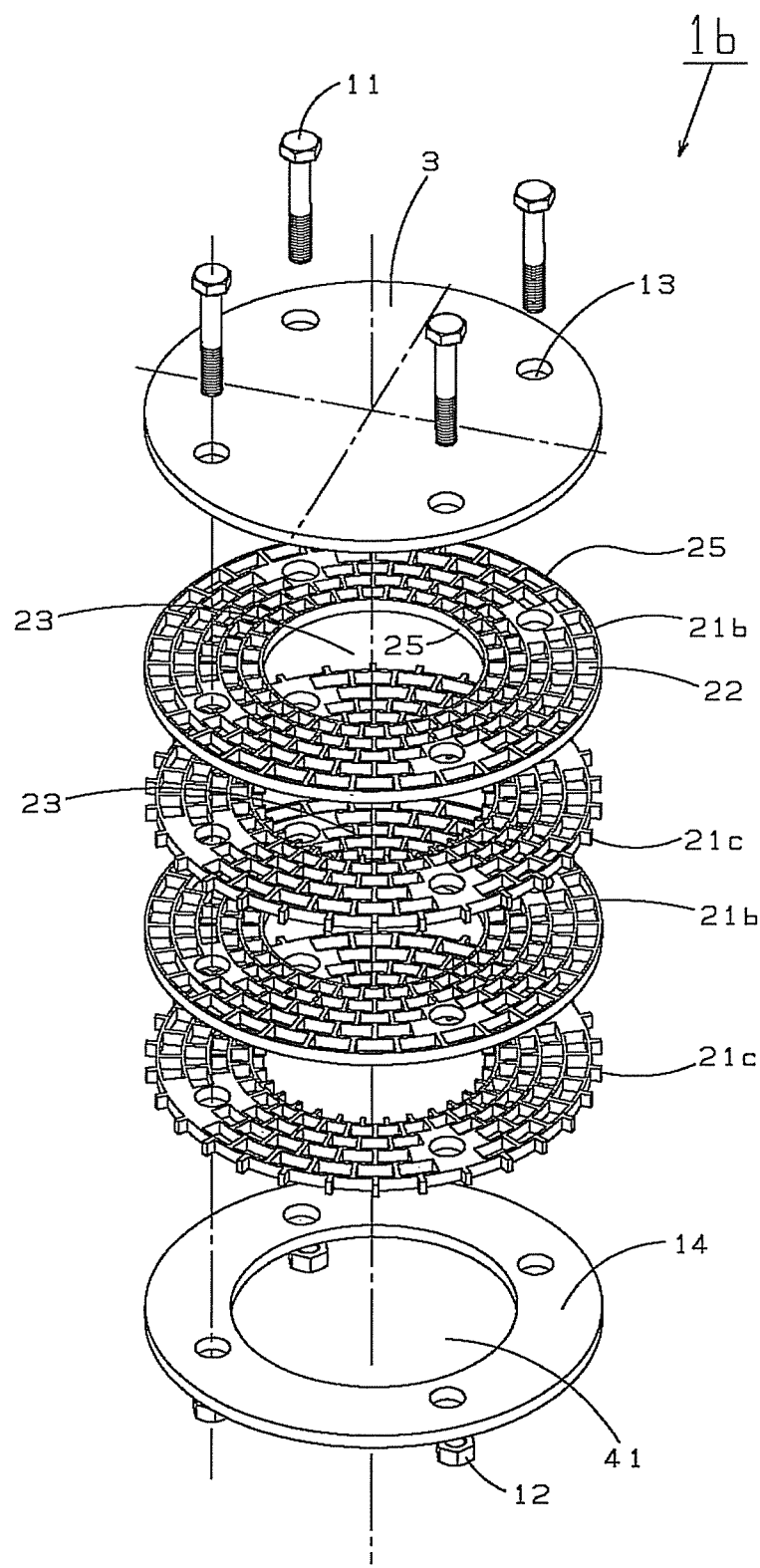
FIG. 3 A perspective view showing the constituent components of a mixing unit according to a second embodiment of the mixing unit.
Figure 4:
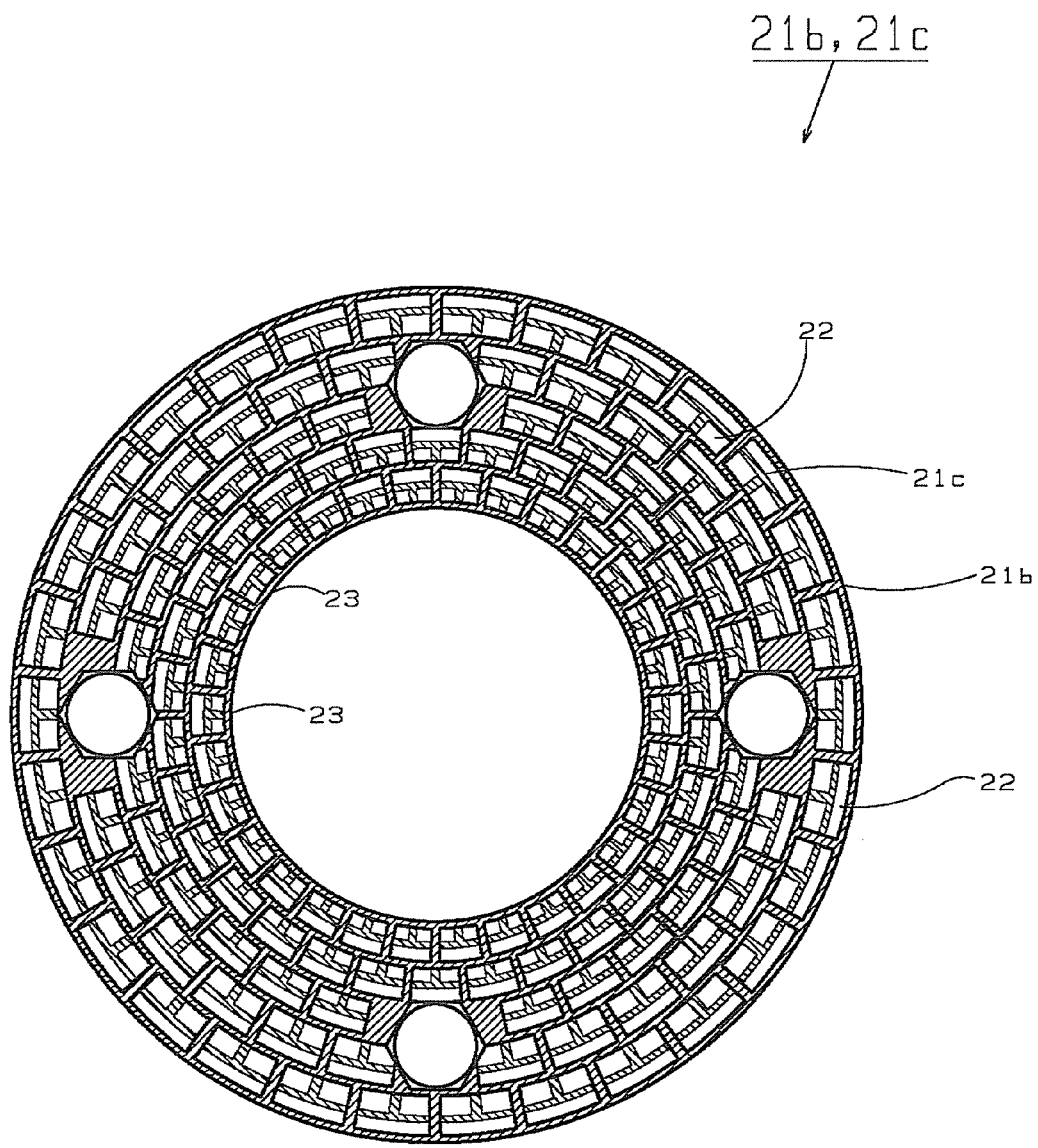
FIG. 4 A plan view showing the stacked state of mixing elements of the mixing unit according to the second embodiment of the mixing unit.

FIG. 3 is a perspective view showing the constituent components of a mixing unit 1b according to a second embodiment. FIG. 4 is a plan view showing the stacked state of first through holes 22 when a mixing element 21b is placed on another mixing element 21c.

The mixing unit 1b of the second embodiment differs from the mixing unit 1a of the first embodiment in that the first through hole 22 is substantially rectangular and the mixing elements 21b and 21c where the first through holes 22 are staggered but are arranged differently are stacked. With reference to FIG. 4, in the mixing element 21b, the first through holes 22 arranged along the inner circumferential surface and the outer circumferential surface are not open whereas, in the mixing element 21c, the first through holes 22 on the inner circumferential surface and the outer circumferential surface are open. The first through holes 22 in the mixing elements 21b and 21c are partly displaced and overlapped in a radial direction and in a circumferential direction, and communicate with each other in the direction in which the mixing elements 21b and 21c extend; the size and pitch between the first through holes 22 are increased as the mixing elements 21b and 21c extend outward in a radial direction.

Even with the configuration of the mixing unit 1b, the fluid A flowed into the mixing unit 1b with appropriate pressure flows into the stacked member 2 through the first through holes 22 that are open to the opening portion 41 of the second plate 4 and the inner circumferential surface of the mixing elements 21c. The fluid A is passed radially within the stacked member 2 and through the first through holes 22 with which the mixing elements 21b and 21c communicate, with the result that the fluid A is highly mixed.

Since, in the second embodiment, the first through holes 22 in the mixing elements 21b and 21c are staggered, when the fluid flows from the above-mentioned first through holes 22 to other first through holes 22 on the upper and lower surfaces, the flow is easily divided or easily combined, and thus the fluid is efficiently mixed.

The other parts of the configuration of and the other effects of the mixing unit 1b of the second embodiment are the same as those of the mixing unit 1a of the first embodiment.

Third Embodiment of the Mixing Unit 1

Figure 5A:
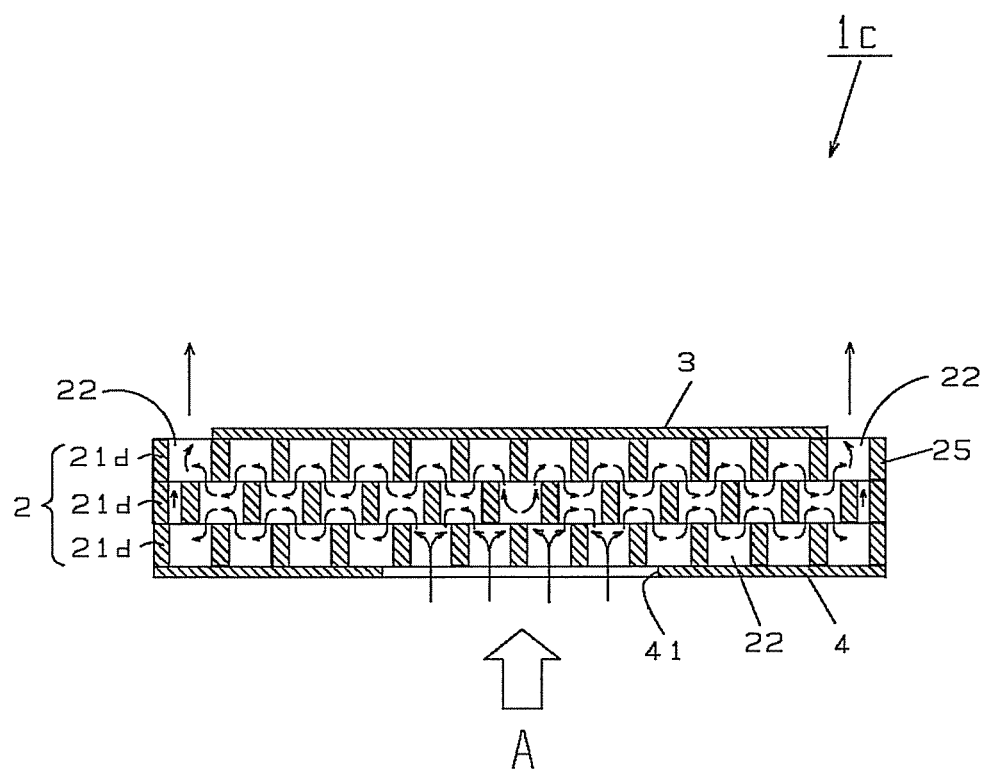
FIG. 5 A cross-sectional view showing how fluid flows through a mixing unit according to a third embodiment of the mixing unit, and a perspective view of mixing elements.
Figure 5B:
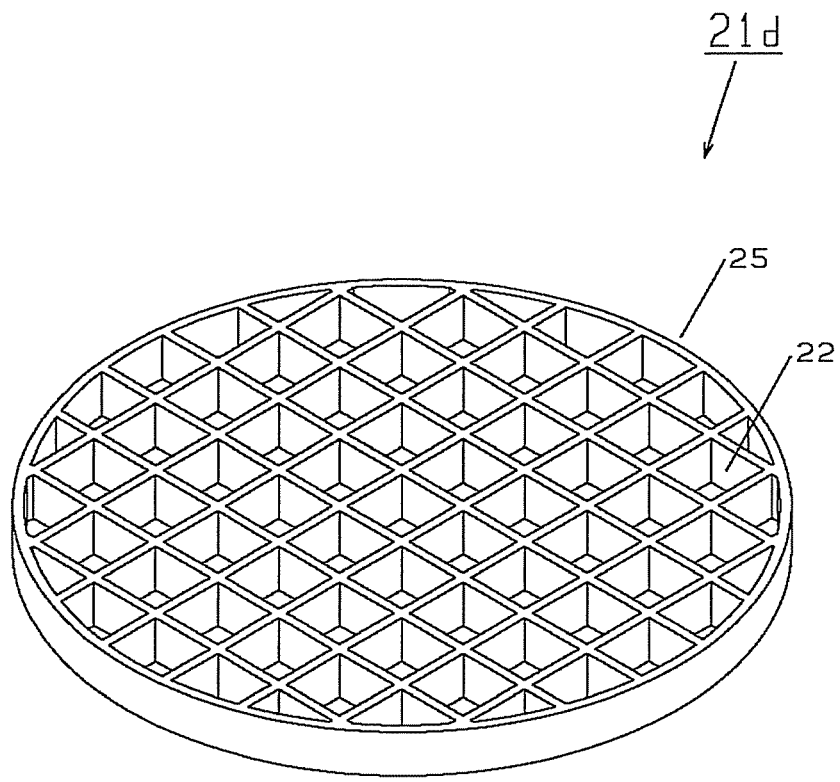

FIG. 5(a) is a cross-sectional view showing how the fluid A flows through a mixing unit 1c according to a third embodiment; FIG. 5(b) is a perspective view showing a mixing element 21d of the mixing unit 1c.

The mixing unit 1c differs from the mixing unit 1a of the first embodiment in that, as shown in FIGS. 5(a) and 5(b), a plurality of mixing elements 21d have the first through holes 22 over the entire surfaces without the provision of the second through holes 23 in the middle and a frame portion 25 (see FIG. 5(b)) that prevents the first through holes 22 from being open to the outer circumferential portion. Each of the first through holes 22 is formed in the shape of a quadrangle (see FIG. 5(b)). The diameter of the first plate 3 is smaller than the diameter of the mixing elements 21d (see FIG. 5(b)) such that the first through holes 22 in the outer portion of the mixing elements 21d stacked on the first plate 3 are open.

Even with the configuration of the mixing unit 1c, the fluid A flowed into the mixing unit 1c with appropriate pressure flows into the stacked member 2 through the opening portion 41 of the second plate 4. The fluid A is passed radially within the stacked member 2 and through the first through holes 22 with which the mixing elements 21d communicate, with the result that the fluid A is highly mixed. Finally, the fluid A flows out through the first through holes 22 that are open to the outer circumferential portion of the first plate 3 placed on one end of the stacked member 2.

As described above, since, in the mixing unit 1c of the third embodiment, the first through holes 22 are formed over the entire surfaces of the mixing elements 21d and thus it is unnecessary to provide the second through holes 23 in the middle, it is easy to produce the mixing unit 1c.

The other parts of the configuration of and the other effects of the mixing unit 1c of the third embodiment are the same as those of the mixing unit 1a of the first embodiment.

(Variations of the Mixing Unit)

The mixing unit 1 according to the present invention is not limited to those described in the first to third embodiments; various variations are possible.

Figure 6A:
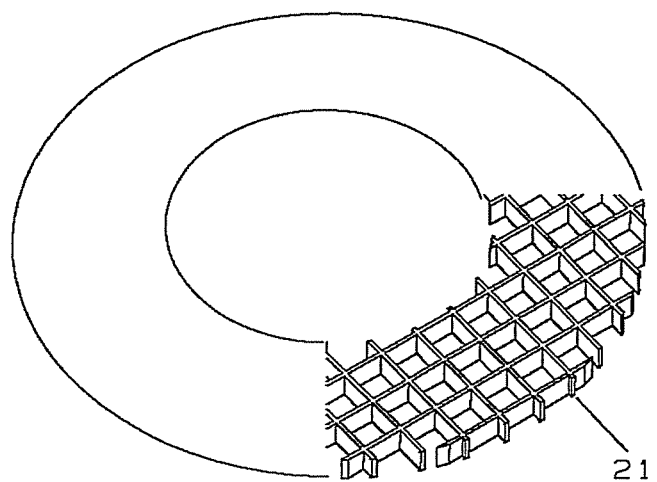
FIG. 6 A perspective view showing variations of the first through holes in the mixing elements.
Figure 6B:
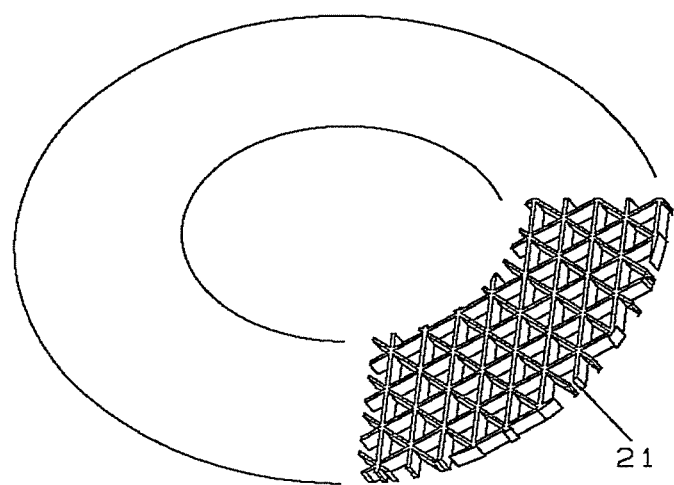
Figure 6C:
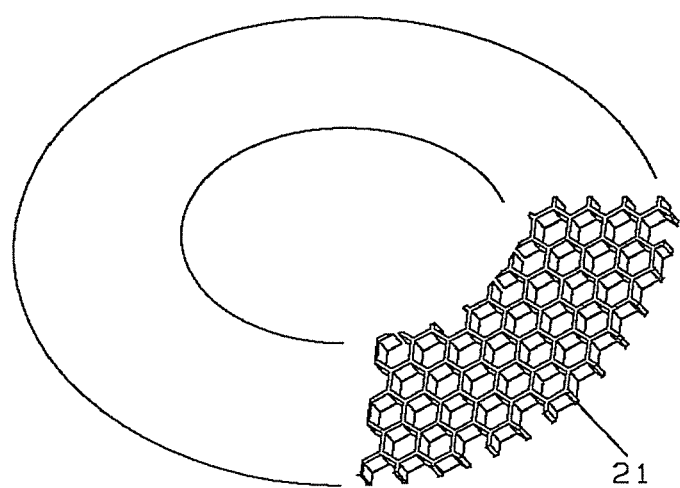
Figure 6D:
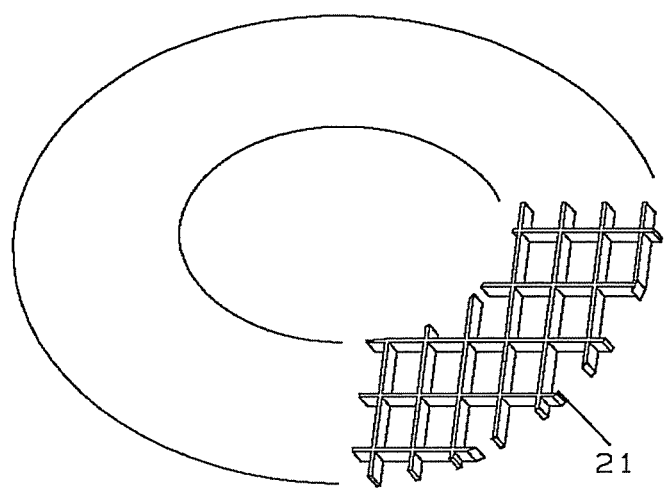

For example, the first through hole 22 of the mixing element 21 is not limited to the circular first through hole or the rectangular first through hole. As shown in FIGS. 6(a) to 6(b), the first through hole 22 may be formed in the shape of a polygon such as a square, a triangle, a hexagon or a rectangle. By forming the first through hole 22 in the shape of a rectangle or a polygon to increase the aperture ratio of the mixing element 21, it is possible to reduce the flow resistance of the mixing unit 1. Although the pitches between the first through holes 22 in the mixing elements 21a are substantially the same as each other, the present invention is not limited to this. As in the mixing elements 21b and 21c, the size and the pitch of the first through holes 22 may be increased as the mixing element extends from the inner circumferential portion to the outer circumferential portion.

Although the outer circumferential shape of the mixing elements 21a, 21b and 21c is substantially circular and the outer circumferential shape of the first plate 3 and the second plate 4 is circular, the present invention is not limited to this. Any other shape that achieves the equivalent function can be employed. Although the second through holes 23 of the mixing elements 21a, 21b and 21c are substantially circular and the opening portion 41 of the second plate 4 is circular, the present invention is not limited to this. Any other shape that achieves the similar function can be employed. Although the mixing elements 21a, 21b and 21c have the second through holes 23 in the middle, the second plate 4 has the opening portion 41 in the middle and the second through hole 23 and the opening portion 41 are substantially equal in diameter to each other and are substantially concentric with each other, the present invention is not limited to this, and any other shape that achieves the similar function can be employed.

The mixing unit 1 may be formed as follows. The mixing elements 21 having a plurality of first through holes 22 arranged in the same positions and having the same shape are used; the first through holes 22 are displaced such that the first through holes 22 overlap partially each other in a radial direction and a circumferential direction.

Two types of mixing element 21b (see FIG. 3) having different inside and outside diameters are used, and thus the first through holes 22 in the inner circumferential portion and the outer portion may be configured to be open.

Since the mixing element 21, the first plate 3 and the second plate 4 have simple configurations, they can also be made of material such as ceramic of which it is difficult to make those having a structure of a conventional fluid guide unit. Thus, it is possible to apply the mixing unit 1 to a product that is required to be resistant to corrosion or heat.

Furthermore, when, in any of the above embodiments of the mixing unit, a substantially annular plate is produced as the mixing element 21, it is possible to produce, for a short period of time, by punching holes in a metal plate such as a perforated plate having a specific thickness. Thus, it is possible to produce the mixing unit 1 at a low cost.

The mixing element 21, the first plate 3, the second plate 4 and the like can be divided into separate structures of various shapes. In this case, it is possible to easily produce even a large mixing unit 1.

Figure 7A:
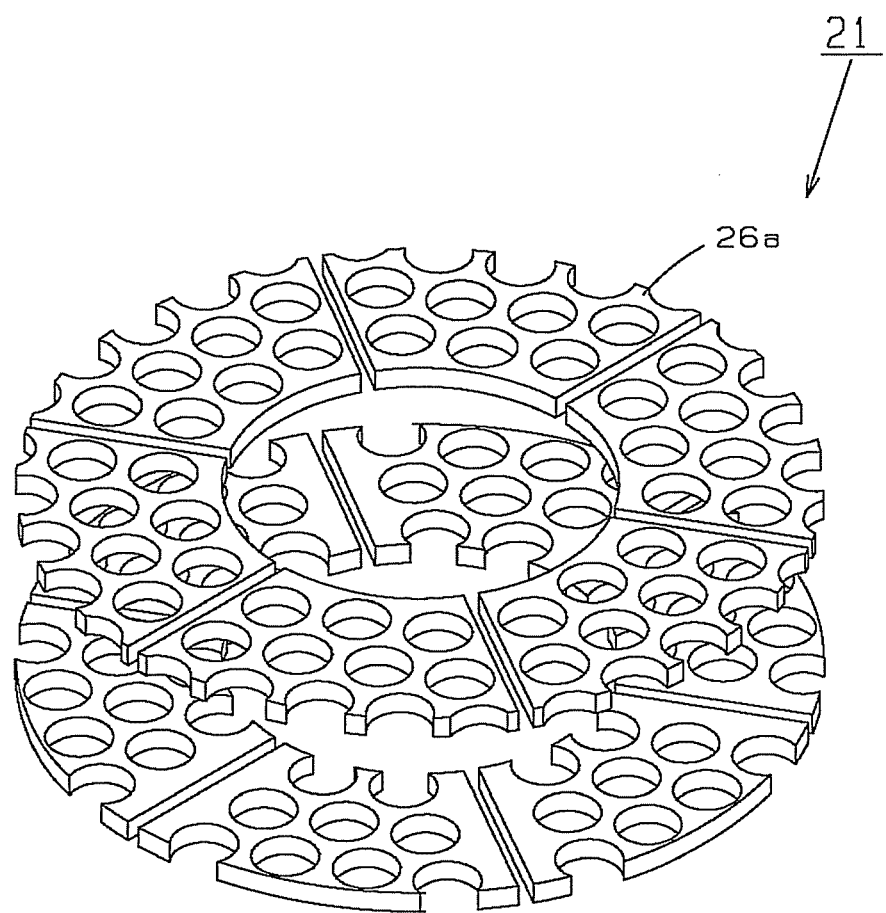
FIG. 7 A perspective view showing an example where a mixing element is divided into separate structures.
Figure 7B:
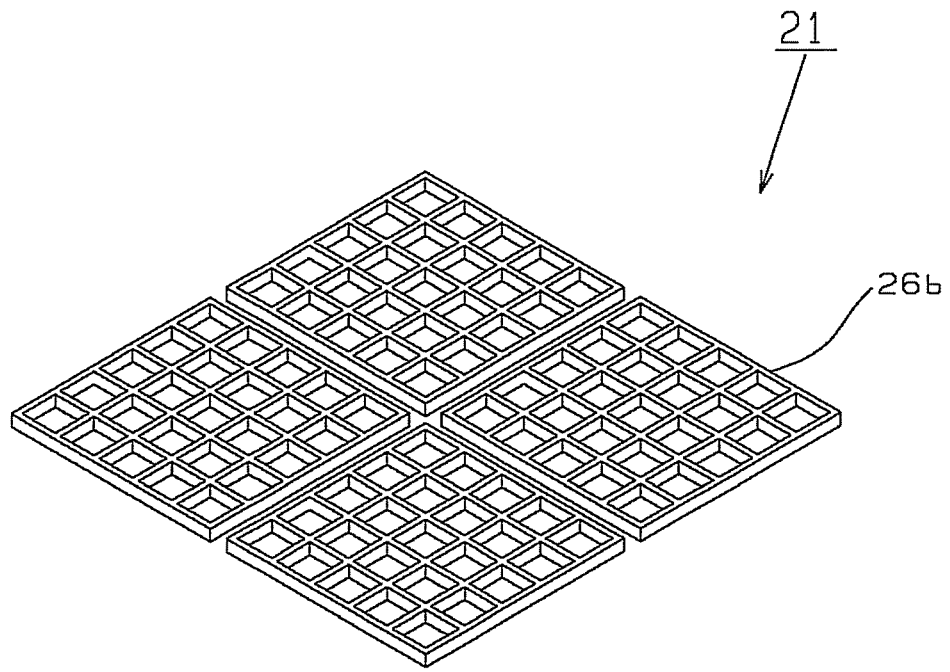

When the mixing element 21 has an annular shape as shown in FIG. 7(a), the mixing element 21 can be divided into separate structures, each composed of a sector-shaped divided member 26a. When the mixing element 21 is formed in the shape of a quadrangle as shown in FIG. 7(b), the mixing element 21 can be divided into separate structures, each composed of a rectangular divided member 26b.

(Embodiment of a Mixing Device)

Figure 8:
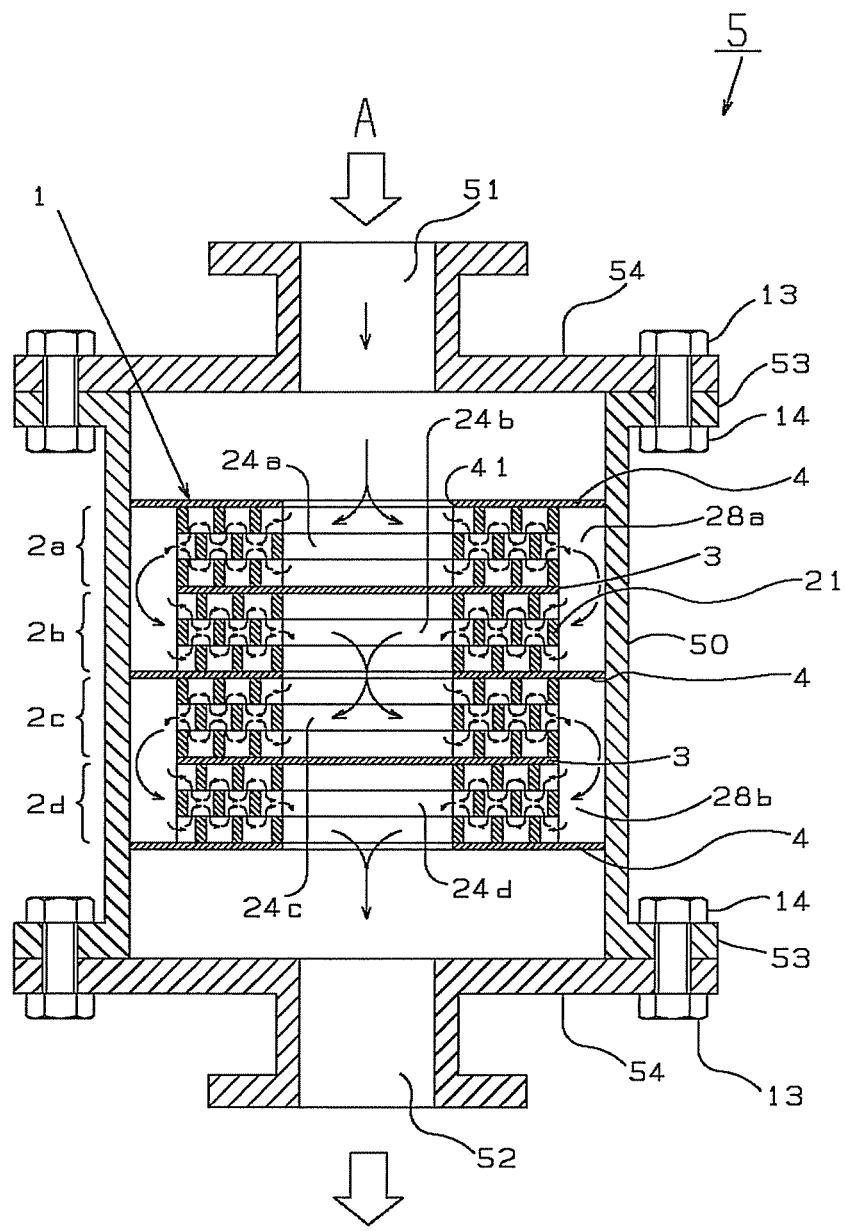
FIG. 8 A cross-sectional view showing how fluid flows through a mixing device according to an embodiment of the mixing device.

FIG. 8 is a cross-sectional view showing how the fluid A flows through a mixing device 5 according to an embodiment of the mixing device.

In the mixing device 5 of the present embodiment, as shown in FIG. 8, a flange 54 having an inlet 51 and an outlet 52 and formed in the shape of an outer circumferential disc is removably fitted to a casing 50 having a flange 53 and formed in the shape of a cylinder. Inside the casing 50, there are provided four stacked members 2 in which a plurality of mixing elements 21 (here, three mixing elements) described previously and composed of discs are stacked.

In the side of the inlet 51 of the casing 50, a second plate 4 having an opening portion 41 in the middle and an outside diameter substantially equal to the inside diameter of the casing 50 is provided, and a first stacked member 2a of the mixing element 21 is provided on the bottom surface of the second plate 4. On the bottom surface of the first stacked member 2a, a first plate 3 having an outside diameter substantially equal to the outside diameter of the mixing element 21 is provided. Then, a second stacked member 2b, the second plate 4, a third stacked member 2c, the first plate 3, a fourth stacked member 2d and the second plate 4 are sequentially provided.

In the mixing device 5 shown in FIG. 8, the mixing unit 1 may be fixed within the casing 50 with fixing means such as bolts and nuts.

As with the mixing unit 1a or 1b according to the embodiment of the mixing unit, the mixing element 21 has a plurality of first through holes 22 and a substantially circular second through hole 23 in the middle. The inside diameter of the second through hole 23 of the mixing element 21 is substantially equal to inside diameter of the opening portion 41 of the second plate 4; the second through hole 23 is substantially concentric with the opening portion 41 of the second plate 4. The mixing elements 21 are stacked, and thus the second through holes 23 constitute a first hollow portion 24a, a second hollow portion 24b, a third hollow portion 24c and a fourth hollow portion 24d, which are hollow space portions. The hollow portions 24a to 24d are hollow portions corresponding to the stacked member 2a to 2d, respectively.

A first annular space portion 28a is formed between the inner circumferential portion of the casing 50 and the outer circumferential portion of the first stacked member 2a and the second stacked member 2b; a second annular space portion 28b is formed between the inner circumferential portion of the casing 50 and the outer circumferential portion of the third stacked member 2c and the fourth stacked member 2d.

Inside the stacked members 2a to 2d, part of a plurality of first through holes 22 communicates in the direction in which the mixing element 21 extends, and part of the mixing elements 21 is open to the inner circumferential surface and the outer circumferential surface.

The first plate 3 and the second plate 4 arranged on both end portions of each of the stacked members 2a to 2d and opposite each other close the first through holes 22 in both end portions of each of the stacked members 2a to 2d in the stacking direction. This prevents the fluid A within the stacked member 2 from flowing through the first through holes 22 in both end portions of each of the stacked members 2a to 2d in the mixing direction; the fluid A is reliably passed within the stacked members 2a to 2d in the direction in which the mixing element 21 extends.

In the mixing device 5 configured as described above, for example, the fluid A flows in through the inlet 51 with appropriate pressure, and flows into the first hollow portion 24a. Then, the fluid A flows into the first stacked member 2a through the first through holes 22 open to the inner circumferential surface of the first hollow portion 24a, and is passed in the direction of the outer circumference through the first through holes 22 communicating with each other. Then, the fluid A flows out through the first through holes 22 open to the outer circumferential surface of the first stacked member 2a, and flows into the first annular space portion 28a.

Then, the fluid A flows into the second stacked member 2b through the first through holes 22 open to the outer circumferential surface of the second stacked member 2b, and is passed in the direction of the inner circumference through the first through holes 22 communicating with each other. Then, the fluid A flows out through the first through holes 22 open to the inner circumferential surface of the second hollow portion 24b, and flows into the second hollow portion 24b.

Thereafter the fluid A flows from the third hollow portion 24c to the third stacked member 2c to the second annular space portion 28b to the fourth stacked member 2d and to the fourth hollow portion 24d, and flows out through the outlet 52. As described above, the fluid A is passed through the first through holes 22 communicating with each other while passing through the stacked members 2a to 2d from the inner circumferential portion to the outer circumferential portion or from the outer circumferential portion to the inner circumferential portion, with the result that the fluid A is highly mixed. In this way, the fluid A flows in through the inlet 51 of the mixing device 5, is highly mixed and flows out through the outlet 52.

In the mixing device 5, the first plate 3 and the second plate 4 arranged on both end portions of each of the stacked members 2a to 2d and opposite each other allow the direction in which the fluid A flows through the stacked member 2 to be changed from the inner circumferential portion to the outer circumferential portion or vise versa, that is, from the outer circumferential portion to the inner circumferential portion. Thus, the fluid A is passed through a larger number of first through holes 22 communicating with each other, with the result that the degree of mixing can be further increased.

Even in the mixing device 5, as with the mixing unit 1a or 1b, each of the hollow portions 24a to 24d is sufficiently larger in size than the first through holes 22, and the second through holes 23 of the mixing elements 22 constituting the hollow portion 24 are substantially equal in inside diameter to each other, and are substantially concentric with each other. Hence, the flow resistance to the fluid A flowing through the hollow portions 24a to 24d is smaller than that of the fluid A flowing through the stacked members 2a to 2d. Likewise, the pressure drop is smaller. Therefore, even when a large number of mixing elements 21 are stacked, the fluid A substantially uniformly reaches the inner circumferential portion of the mixing elements 21 regardless of the position of the mixing direction, and substantially uniformly flows through the stacked members 2a to 2d from the inner circumferential portion to the outer circumferential portion or vise versa, that is, from the outer circumferential portion to the inner circumferential portion.

The fluid A flows from the annular space portion 28a and 28b into the stacked member 2b and 2d in the same manner as the hollow portions 24a to 24d.

Since, in the mixing device 5, the fluid A can be mixed within the casing 50 having the inlet 51 and the outlet 52, it is possible to use the mixing device 5 as an in-line static mixing device and continuously mix the fluid A.

Since the outer circumferential shapes of the mixing element 21, the first plate 3 and the second plate 4 are circular and thus the casing 50 can be cylindrical, it is possible to increase the pressure-resistance of the casing 50. Thus, it is possible to mix the fluid A at a high pressure.

The other parts of the configuration of and the other effects of the mixing device 5 according to the present embodiment are the same as those of the mixing unit 1a or 1b according to the embodiment of the mixing unit.

As in the variations of the mixing unit, the mixing device 5 according to the present invention is not limited to the mixing device of the embodiment described above. Variations are possible within the scope of the present invention.

The outer circumferential shapes of the mixing element 21, the first plate 3 and the second plate 4 are not limited to the circular shape. This is because the present invention is practiced without any problem even if the outer circumferential shapes are not circular. When the mixing device 5 is used in a pipe line having a rectangular cross section such as in an exhaust gas treatment unit in a factory, the outer shape of the second plate 4 is preferably substantially the same as the inner shape of the rectangular pipe line.

The fluid to be mixed is not limited to gas and liquid; it may be liquid, solid or the like. In particular, when particles are dissolved in liquid, in a conventional fluid guide unit having, in a disc, polygonal-shaped compartments whose front surfaces are open, it is difficult to remove the particles blocking the compartments. However, since the mixing device 5 according to the present invention can be disassembled, it is easy to remove the particulates blocking the compartments.

One application is to make the concentration of liquid uniform, and, for example, the mixing device can also be applied to mix liquids of the same type having different temperatures so that the resulting liquid have the uniform temperature.

Since a large space is not required and can be arranged in a pipe line, for example, the mixing unit 1 or the mixing device 5 can also be used in a location, such as an exhaust gas line of a diesel car, where an installation space is limited.

(Embodiment of an Agitation Impeller)

Figure 9:
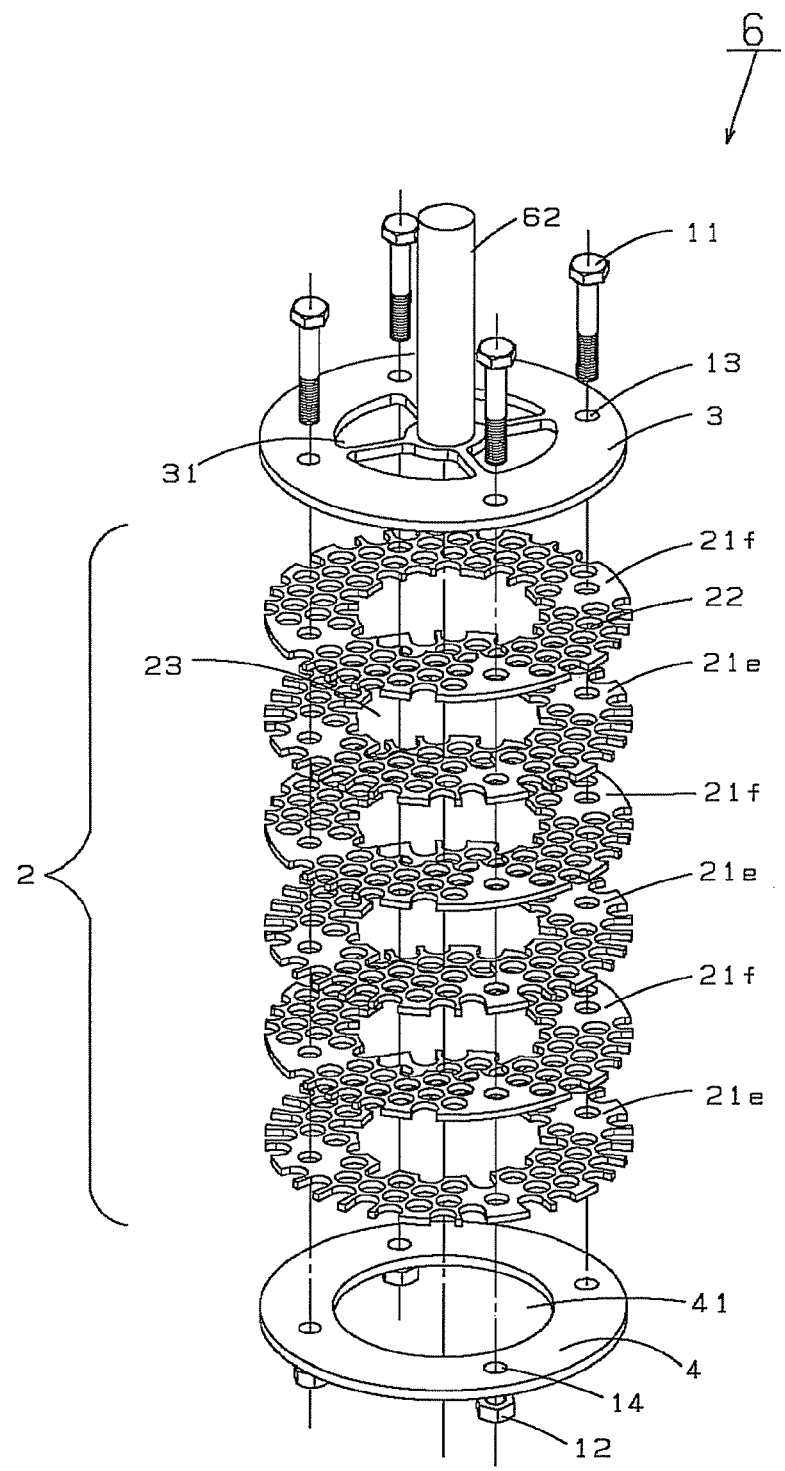
FIG. 9 A perspective view showing the constituent components of an agitation impeller according to an embodiment of the agitation impeller.
Figure 10:
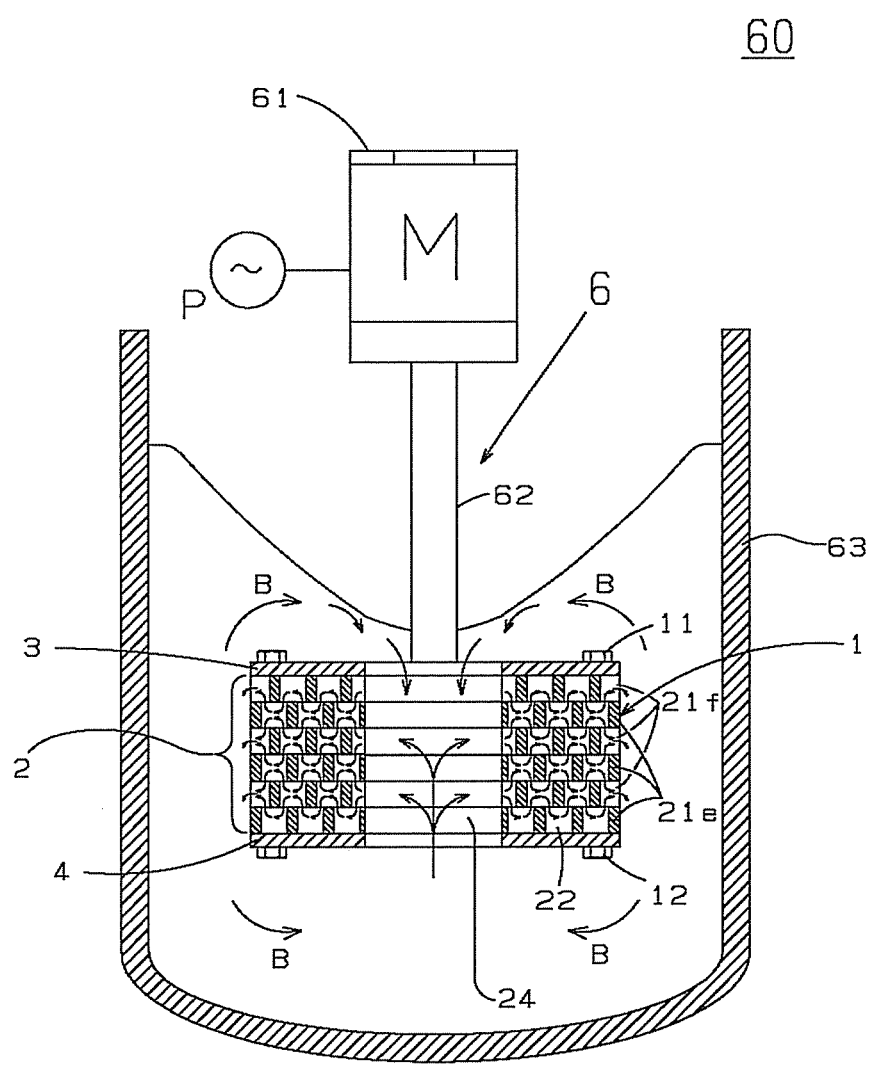
FIG. 10 A cross-sectional view showing how fluid flows through the agitation impeller according to the embodiment of the agitation impeller and arranged within a mixing vessel.

FIG. 9 is a perspective view showing the constituent components of an agitation impeller 6 according to an embodiment of the agitation impeller. FIG. 10 is a cross-sectional view showing how a fluid B circulates within the agitation impeller 6 in an agitation device 60 in which the agitation impeller 6 is arranged within a mixing vessel 63.

With reference to FIG. 9, the mixing unit 1 is configured by sandwiching a stacked member 2, in which a plurality of substantially disc-shaped mixing elements 21e and 21f are stacked, between a first plate 3 and a second plate 4 with fastening members composed of four bolts 11 and nuts 12 appropriately arranged.

The first plate 3 is a disc that has holes 13 for the bolts and four opening portions 31 through which the fluid B flows in, and has a rotation shaft 62 fitted thereto. The second plate 4 has holes 14 for the bolts and a circular opening portion 41 in the middle through which the fluid B flows out. The first plate 3 and the second plate 4 are substantially equal in outside diameter to the mixing elements 21e and 21f.

Figure 12A:
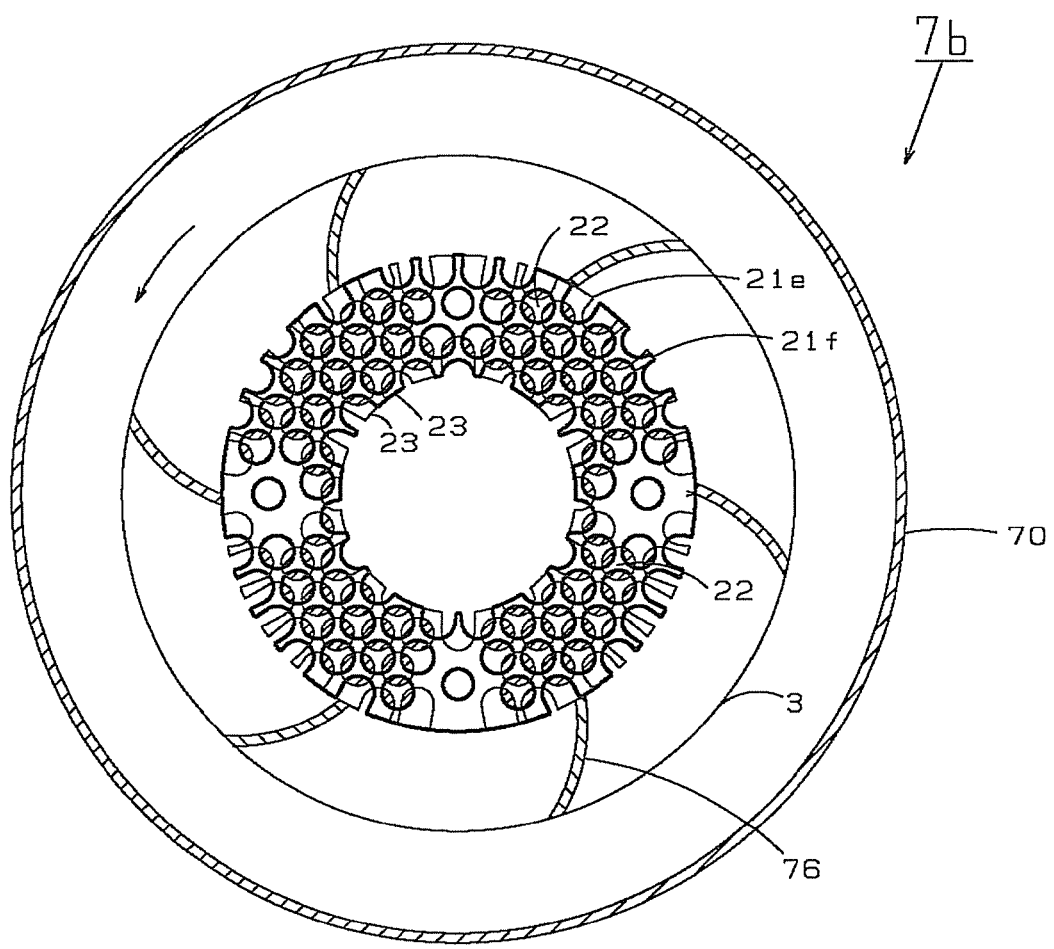
FIG. 12(a) is a cross-sectional view taken along line I-I of FIG. 12(b)

As shown in FIG. 12(a) illustrating a second embodiment of a pump mixer to be described later, the mixing elements 21e and 21f have a plurality of circular first through holes 22 that are staggered, and have substantially circular second through holes 23 in the middle through which the fluid B circulating within the mixing vessel 63 flows in. The second through holes 23 of the mixing elements 21e and 21f are substantially equal in inside diameter to and are substantially concentric with the opening portion 41 of the second plate 4. The mixing elements 21e and 21f are stacked, and thus the second through holes 23 form a hollow portion 24.

Preferably, in the present embodiment of the agitation impeller, the first through holes 22 in the mixing elements 21e and 21f are formed, as seen in plan view, symmetrically with respect to a straight line passing through the center in order for the mixing unit 1 fitted to the rotation shaft 62 to rotate. However, the present invention is not limited to this as long as the balance of the mixing unit 1 as a whole is maintained.

The other parts of the configuration of the mixing unit 1 are the same as those of the mixing unit 1a or 1b according to the embodiment of the mixing unit.

With reference to FIG. 10, when the agitation impeller 6, that is, the mixing unit 1 fitted to the rotation shaft 62 is driven to rotate by a motor 61 to which electric power is supplied from an unillustrated power supply, a force acting outward in a radial direction due to the centrifugal force is applied to the fluid B within the stacked member 2 of the mixing unit 1. The fluid B receiving the force is substantially radially passed through the first through holes 22 communicating with each other within the stacked member 2 from the inner circumferential portion to the outer circumferential portion, and is discharged outward from the first through holes 22 open to the outer circumferential surface.

On the other hand, the fluid B within the mixing vessel 63 is sucked into the hollow portion 24 within the stacked member 2 through the opening portion 41 of the second plate 4 on the lower end and the four opening portions 31 of the first plate 3 on the upper end of the mixing unit 1. The sucked fluid B flows into the stacked member 2 through the first through holes 22 open to the inner circumferential surface of the hollow portion 24. Then, a force acting outward in a radial direction due to the centrifugal force resulting from the rotation operation of the mixing unit 1 is applied to the sucked fluid B, and the sucked fluid B is discharged outward from the first through holes 22 open to the outer circumferential surface.

Then, when the fluid B substantially radially flows through the stacked member 2 from the inner circumferential portion to the outer circumferential portion, the fluid B is passed through the first through holes 22 communicating with each other, and thus the fluid A is highly mixed.

Since, when the agitation impeller 6 is used, the number of the mixing elements 21e and 21f is increased and thus the number of the first through holes 22 increases that communicate with each other within the mixing unit 1 through which the fluid is passed, it is possible to decrease the operation time in which the fluid is mixed within the mixing vessel 63.

As in the embodiments and variations of the mixing unit, the agitation impeller of the present invention is not limited to the first embodiment of the agitation impeller 6.

The other effects of the agitation impeller 6 according to the first embodiment are the same as those of the mixing unit 1a or 1b according to the embodiment of the mixing unit.

(First Embodiment of a Pump Mixer)

Figure 11:
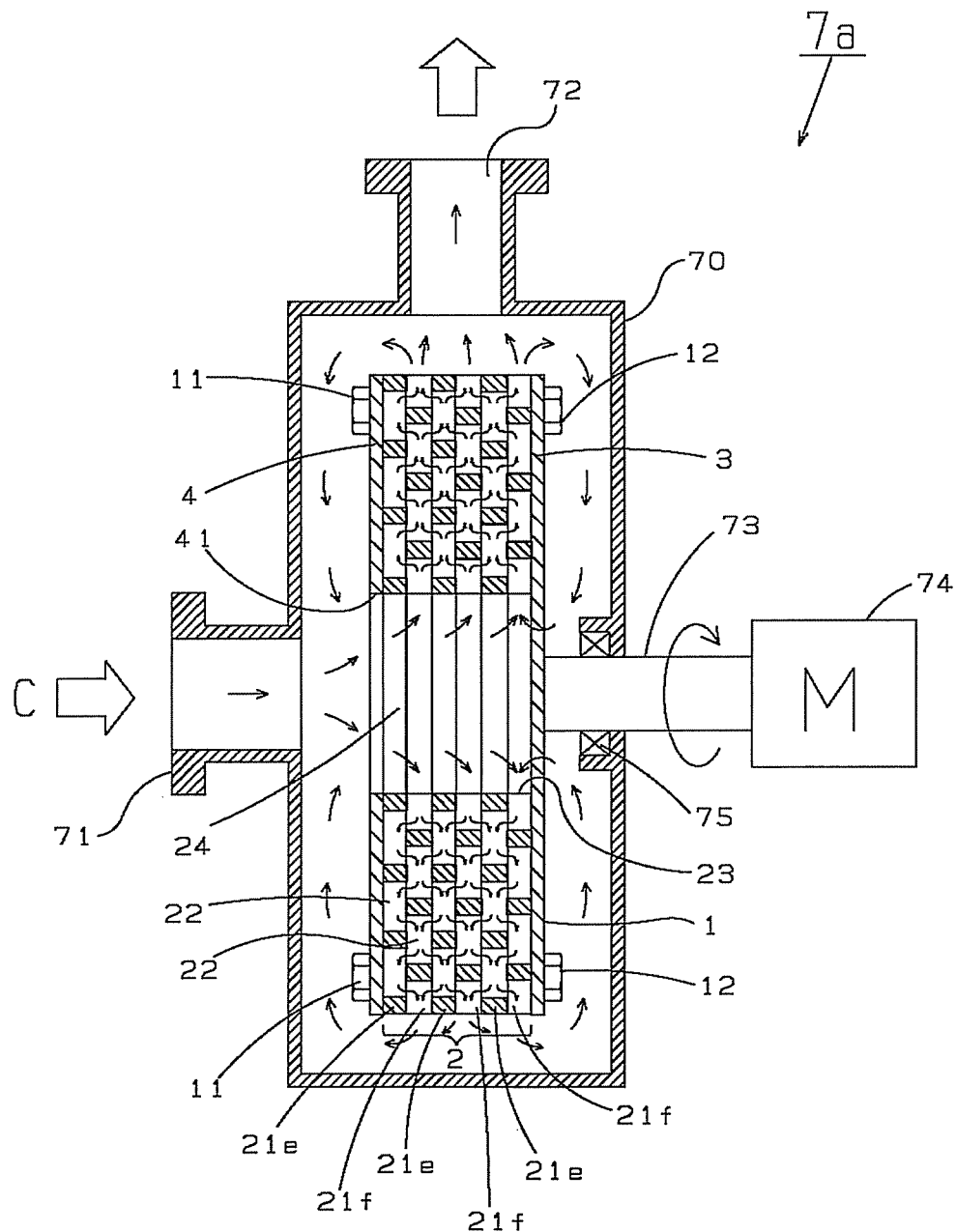
FIG. 11 A cross-sectional view showing how fluid flows through a pump mixer according to a first embodiment of the pump mixer.

FIG. 11 is a cross-sectional view showing how a fluid C flows through a pump mixer 7a according to a first embodiment of the pump mixer.

As shown in FIG. 11, the pump mixer 7a includes a mixing unit 1, a cylindrical casing 70, a rotation shaft 73 and an electric motor 74 serving as a drive source. The electric motor 74 rotatably drives the mixing unit 1; in the present embodiment, the electric motor 74 is driven to rotate by supplying electric power from an unillustrated power supply. The rotation shaft 73 is coupled to the electric motor 74 and simultaneously supports the mixing unit 1. A seal member 75 is provided to a portion in which the rotation shaft 73 slides with the casing 70 so as to prevent the leakage of fluid C.

The casing 70 has flange-shaped suction nozzle 71 and discharge nozzle 72; the fluid C is sucked into the pump mixer 7a through the suction nozzle 71 and is discharged through the discharge nozzle 72.

The mixing unit 1 has the same structure as the agitation impeller 6 shown in FIG. 9. Preferably, in the first embodiment of the pump mixer, in order for the mixing unit 1 fitted to the rotation shaft 73 to rotate, the first through holes 22 in the mixing elements 21e and 21f are formed, as seen in plan view, symmetrically with respect to a straight line passing through the center. However, the present invention is not limited to this as long as the balance of the mixing unit 1 as a whole is maintained.

When the mixing unit 1 is driven to rotate by the electric motor 74, the fluid C sucked from the suction nozzle 71 of the pump mixer 7a flows into the hollow portion 24 through the opening portions 31 of the first plate 3 and the opening portion 41 of the second plate 4 constituting the mixing unit 1. Then, the fluid C flows into the stacked member 2 through the first through holes 22 in the mixing elements 21e and 21f open to the inner circumferential portion of the hollow portion 24.

A force acting outward in a radial direction due to the centrifugal force is applied to the fluid C that has flowed into the stacked member 2. The fluid C receiving the force is radially passed through the first through holes 22 communicating with each other within the stacked member 2 from the inner circumferential portion to the outer circumferential portion, and is discharged outward from the outer circumferential portion of the stacked member 2 through the first through holes 22 open to the outer circumferential portion. The fluid C that flowed out is discharged from the pump mixer 7a through the discharge nozzle 72.

Part of the fluid C that flowed out of the mixing unit 1 flows again into the hollow portion 24 through the opening portions 31 of the first plate 3 and the opening portion 41 of the second plate 4, further flows into the stacked member 2 and flows out from the outer circumferential portion of the stacked member 2, with the result that the fluid C circulates within the stacked member 2 of the mixing unit 1.

Then, when the fluid C substantially radially flows through the first through holes 22 communicating with each other within the stacked member 2 from the inner circumferential portion to the outer circumferential portion, the fluid is repeatedly divided, combined, reversed and subjected to turbulent flow, eddying flow, collision and the like, and thus the fluid is highly mixed.

Although, in the first embodiment, the casing 70 is cylindrical, the present invention is not limited to this. When it is difficult to fit the rotation shaft 73 to the first plate 3, the opening portions 31 may be omitted in the first plate 3.

When the required degree of mixing is low, the clearance between the mixing unit 1 and the suction nozzle 71 is reduced as with a conventional centrifugal pump and thus the flow rate of fluid C circulation within the pump mixer 7a may be reduced.

(Second Embodiment of the Pump Mixer)

Figure 12B:
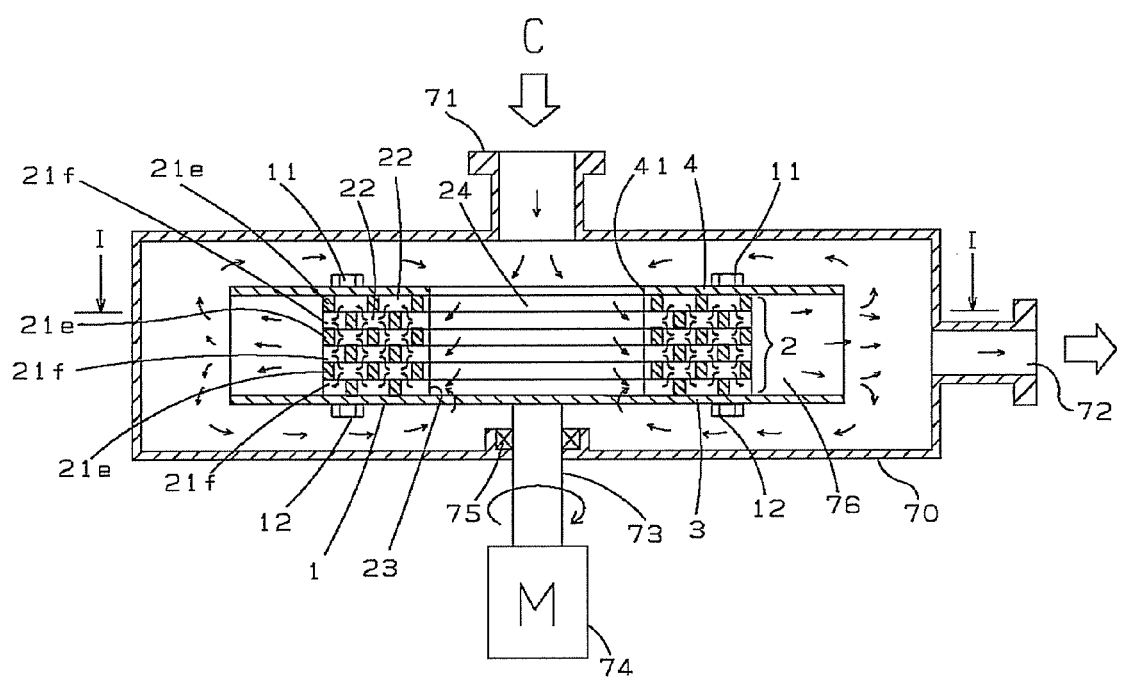
FIG. 12(b) is a cross-sectional view showing how fluid flows through the pump mixer.

FIG. 12 is a diagram showing a pump mixer 7b according to a second embodiment of the pump mixer. FIG. 12(a) is a cross-sectional view taken along line I-I of FIG. 12(b); FIG. 12(b) is a cross-sectional view showing how the fluid C flows through the pump mixer 7b.

The pump mixer 7b differs from the pump mixer 7a of the first embodiment in that the outer circumferential shape of the first plate 3 and the second plate 4 is larger than that of the mixing elements 21e and 21f, and that blades 76 (here, six blades) extending in the direction in which the mixing elements 21e and 21f are stacked are provided in a space formed by the first plate 3 and the second plate 4, that is, the outer circumferential portion of the stacked member 2.

When the mixing unit 1 rotates, the fluid C that has flowed out of the outer circumferential portion of the stacked member 2 flows out of the mixing unit 1 by receiving a force from the blades 76. Since the ends of the blades 76 are closed by the first plate 3 and the second plate 4, the fluid C that has flowed out of the outer circumferential portion of the stacked member 2 efficiently receives the force, and thus it is possible to increase the pressure of the fluid C discharged from the pump mixer 7b.

Although the blades 76 are provided in the space formed by the first plate 3 and the second plate 4, the present invention is not limited to this. For example, another disc may be attached to the mixing unit 1 to fix the blades 76. Although the blades 76 are provided to extend in a direction perpendicular to the direction in which the mixing elements 21e and 21f extend, the present invention is not limited to this. The blades 76 may be inclined as long as the effects of the present invention are achieved.

Although, in the cross-sectional view of FIG. 12(b), the blades 76 are curved, the present invention is not limited to this. The blades 76 may be straight.

The other parts of the configuration of and the other effects of the pump mixer 7b according to the second embodiment of the pump mixer are the same as those of the pump mixer 7a of the first embodiment.

(Embodiment of a Mixing System)

Figure 13:
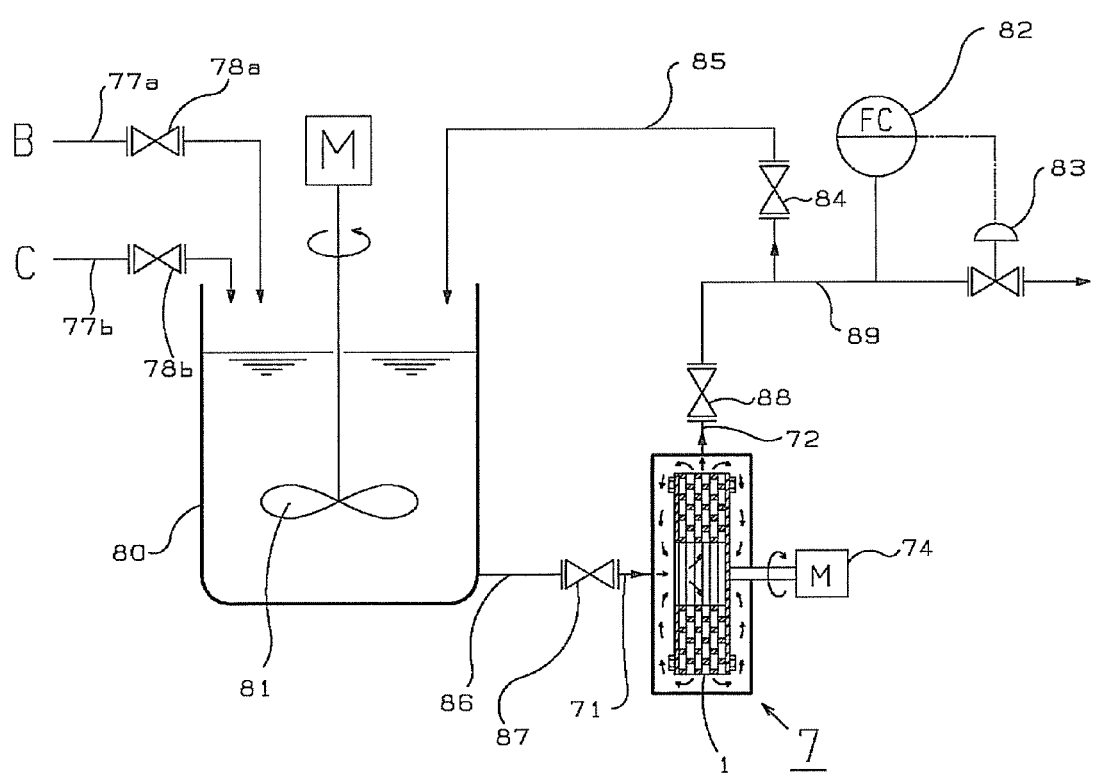
FIG. 13 A diagram showing the configuration of a mixing system using the pump mixer according to the present invention in the embodiment of the mixing system.

FIG. 13 is a diagram showing the configuration of a mixing system according the embodiment of the mixing system for mixing fluid with the pump mixer. In this example of use, fluid is continuously mixed by the pump mixer 7 and is fed out.

Fluid B and fluid C are fed to a fluid storage vessel 80 from lines 77a and 77b through valves 78a and 78b, respectively. The fluid storage vessel 80 is provided with an agitation blade 81 for agitating the fluids B and C somewhat uniformly. A nozzle 86 is provided below the fluid storage vessel 80, and is connected to the suction nozzle 71 of the pump mixer 7 through a valve 87. The discharge nozzle 72 of the pump mixer 7 is connected to a feed-out line 89 through a valve 88.

The feed-out line 89 branches off to a circulation line 85 communicating with the fluid storage vessel 80. The circulation line 85 is provided with a valve 84 for controlling the flow rate of circulation fluid.

In this example of use, in order for the mixing to be performed on the fluids B and C, the fluids B and C are stored in the fluid storage vessel 80, and are somewhat uniformly agitated by the agitation blade 81. Then, the electric motor 74 is driven to rotate the mixing unit 1, and the fluids B and C are sucked from the suction nozzle 71 by the pump action resulting from the rotation.

Within the pump mixer 7, the sucked fluids B and C are radially passed through the first through holes 22 communicating with each other within the stacked member 2 constituting the mixing unit 1 from the inner circumferential portion to the outer circumferential portion, and are thereby mixed. The sucked fluids B and C are discharged from the discharge nozzle 72 of the pump mixer 7, are controlled by a flow rate controller 82 and a flow rate control valve 83 and are fed out of the system through the feed-out line 89.

The feed-out line 89 branches off to the circulation line 85 communicating with the fluid storage vessel 80, and part of the fluids B and C discharged from the pump mixer 7 is returned to the fluid storage vessel 80. Since the circulation line 85 is provided in this way and thus the fluids B and C are returned from the fluid storage vessel 80 to the pump mixer 7 where the fluids B and C are repeatedly mixed, the degree of mixing of the fluids B and C is increased, and the fluids B and C can be fed out of the system.

Since the degree of opening of the outlet valve 88 arranged in the discharge of the pump mixer 7 is adjusted and thus it is possible to adjust the flow rate of fluid circulation within the stacked member 2 of the mixing unit 1 inside the pump mixer 7, it is possible to adjust the degree of mixing of the fluids B and C by the pump mixer 7.

Moreover, since the degree of opening of the valve 84 arranged in the circulation line 85 is adjusted and thus it is possible to adjust the flow rate of fluid circulation through the circulation system including the fluid storage vessel 80 and the pump mixer 7, it is also possible to adjust the degree of mixing of the fluids B and C. In this case, the valve 88 and the valve 84 may be automatically controlled valves.

After the fluids B and C are fed to the fluid storage vessel 80, the pump mixer 7 is operated with all of the valves 78a and 78b and the flow rate control valve 83 fully closed, and thus the fluids B and C may be circulated throughout the mixing system and may be mixed.

(First Embodiment of a Reaction Device)

Figure 14:
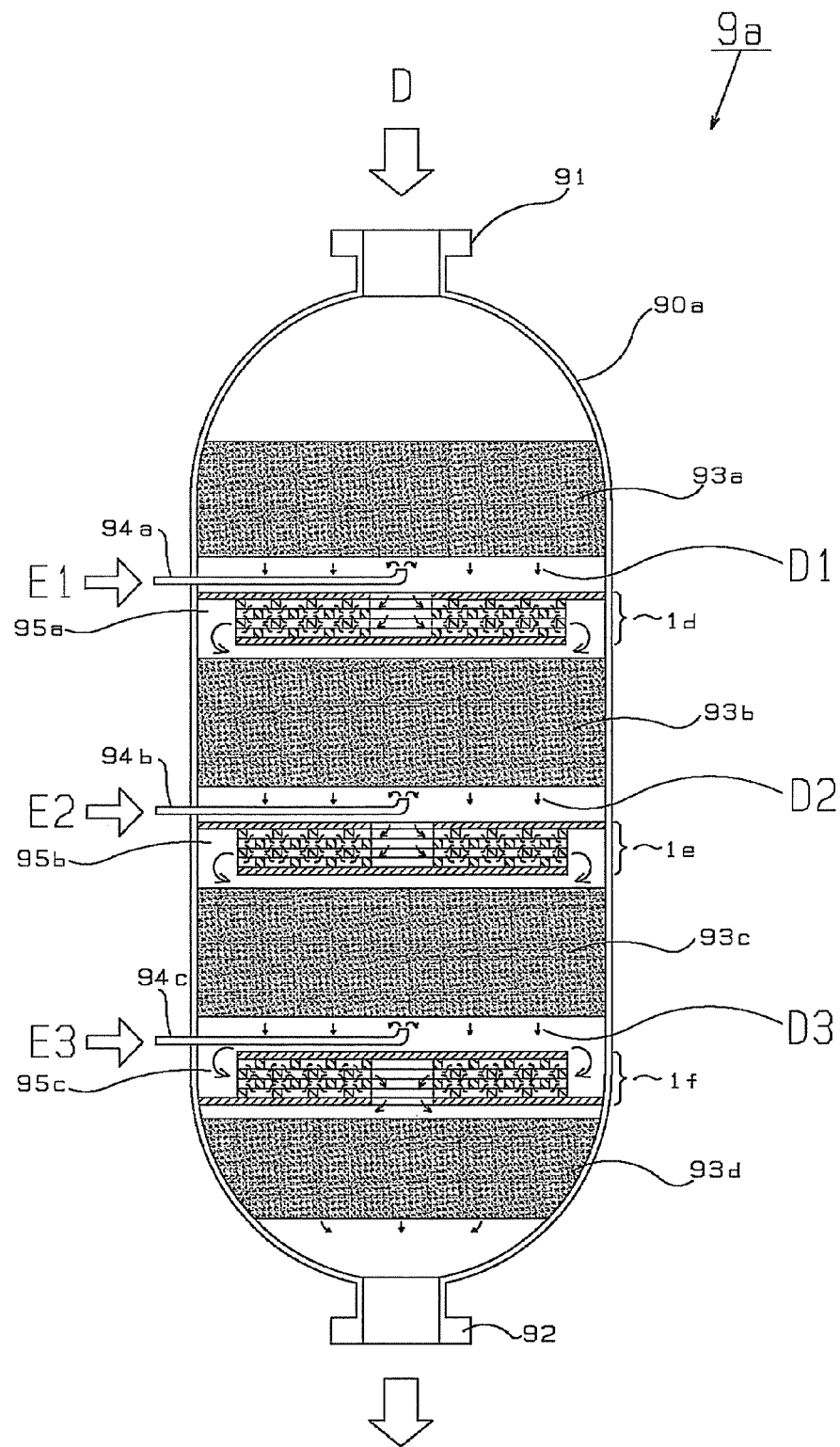
FIG. 14 A cross-sectional view showing how fluid flows through a reaction device according to a first embodiment of the reaction device.
Figure 15A:
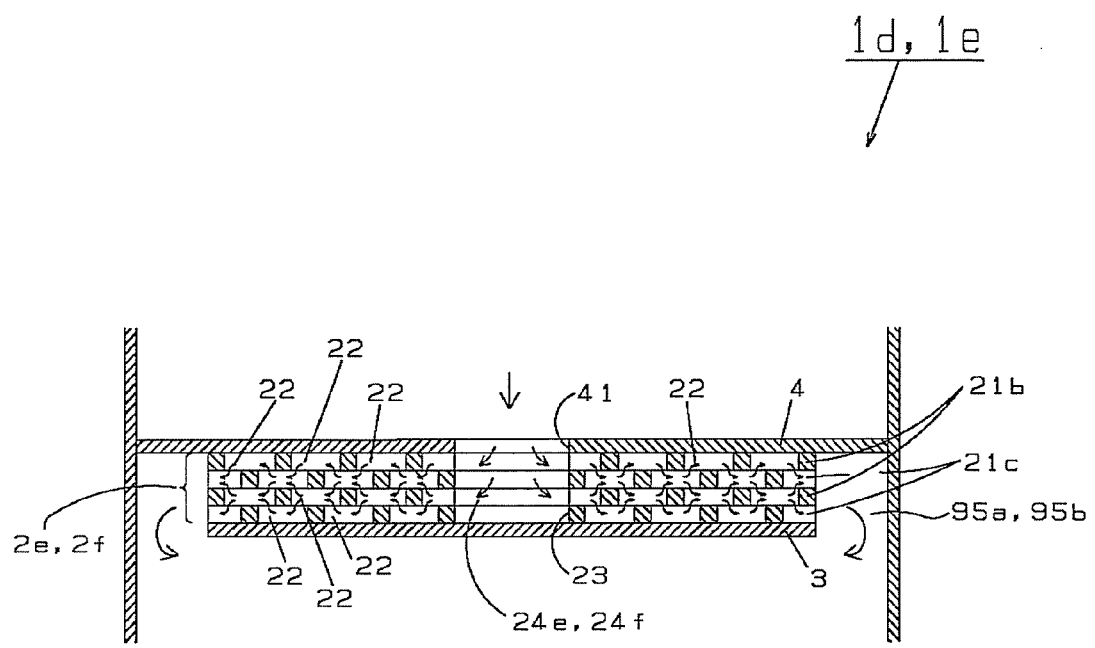
FIG. 15 A cross-sectional view showing how fluid flows through a mixing unit according to the first embodiment of the reaction device.
Figure 15B:
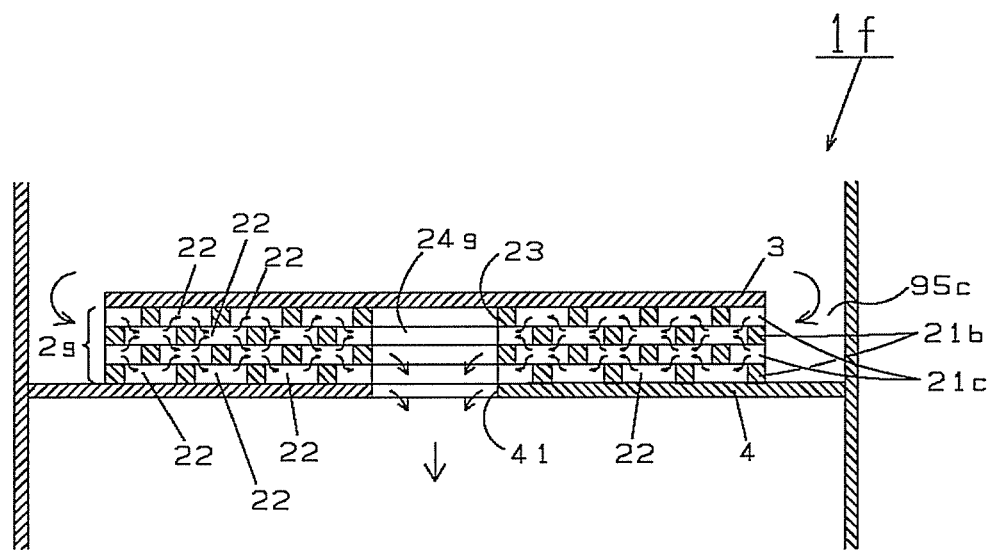

FIG. 14 is a cross-sectional view showing how a fluid D and a fluid E flows through a reaction device 9a according to a first embodiment of the reaction device; FIGS. 15(a) and 15(b) are cross-sectional views showing how the fluids D and E flow through mixing units 1d to 1f arranged in the reaction device 9a.

In the reaction device 9a, catalyst layers 93a to 93d are provided within a substantially cylindrical vessel 90a having an inlet 91 and an outlet 92, and the mixing units 1d to 1f and cooling gas feed nozzles 94a to 94c are arranged between the catalyst layers 93a to 93d.

In the first embodiment, the reaction device 9a can be desirably used as a methanol synthesis reactor that involves a heterogeneous exothermic reaction; for example, a preheated high-temperature raw gas (fluid D) is fed from the inlet 91, and low-temperature raw gases (fluids E1 to E3) that are not preheated are fed from the cooling gas feed nozzles 94a to 94c.

As with the mixing unit 1b according to the second embodiment of the mixing unit, the mixing units 1d to 1f are configured by sandwiching the stacked member 2, in which a plurality of substantially disc-shaped mixing elements 21b and 21c are stacked, between the first plate 3 and the second plate 4 with appropriate fixing means, and the mixing units 1d to 1f are further fixed within the vessel 90a with appropriate fixing means.

The first plate 3 is a circular plate; the outside diameter of the first plate 3 is substantially equal to the outside diameter of the mixing elements 21b and 21c. The second plate 4 is a circular plate having a circular opening portion 41 substantially in the middle through which the fluids D and E flows in; the opening portion 41 is substantially equal in inside diameter to the second through holes 23 of the mixing elements 21b and 21c, and the outside diameter of the opening portion 41 is substantially equal to the inside diameter of the vessel 90a. The stacked state of the first through holes 22 in the mixing elements 21b and 21c constituting the mixing units 1d to 1f is the same as that of the mixing unit 1b.

With respect to the mixing units 1d to 1f described above, for example, in the mixing unit 1d, a high-temperature fluid D1 that has flowed from the inlet 91 of the reaction device 9a with appropriate pressure and that has passed through the catalyst layer 93a along with a fluid E1 fed from the cooling gas feed nozzle 94a flows into a hollow portion 24e through the opening portion 41 of the second plate 4. The fluids D1 and E1 that have flowed in flow into a stacked member 2e through the first through holes 22 in the mixing element 21c communicating with the hollow portion 24e, and repeatedly flow in and out between the first through holes 22 communicating with each other, with the result that the fluids D1 and E1 are mixed. The mixed fluids D1 and E1 flow out of the hollow portion 24e through the first through holes 22 in the mixing element 21c communicating with an outside space portion 95a of the stacked member 2e.

As described above, when the fluids D1 and E1 are passed through the first through holes 22 communicating with each other within the stacked member 2e from the inner circumferential portion to the outer circumferential portion, they are divided, combined, reversed and subjected to turbulent flow, eddying flow, collision and the like, and thus the fluids D and E are highly mixed. Then, the highly mixed fluids D1 and E1 are fed to the downstream catalyst layer 93b, and thus the reaction rate in the catalyst layer 93b is increased.

As with the mixing unit 1b, the flow resistance to the fluid flowing through the hollow portion 24e is smaller than that of the fluid flowing through the stacked member 2e in the direction in which each of the mixing elements 21b and 21c extends. Therefore, even when a large number of mixing elements 21b and 21c are stacked, the fluids D1 and E1 substantially uniformly reach the inner circumferential portion of the mixing elements 21b and 21c regardless of the position of the mixing direction, and substantially uniformly flow through the stacked member 2 from the inner circumferential portion to the outer circumferential portion.

The first embodiment described above deals with the mixing unit 1d. Likewise, the fluids D1 and E1 are highly mixed by the mixing unit 1e.

On the other hand, in the mixing unit 1f, in contrast to the mixing units 1d and 1e, the first plate 3 is arranged on the upper portion of the stacked member 2g and the second plate 4 is arranged on the lower portion thereof. Even with the mixing unit 1g configured as described above, the fluids D3 and E3 flow into the stacked member 2g through the first through holes 22 in the mixing element 21c communicating with an outside space portion 95c of the stacked member 2g, and flow out through the first through holes 22 in the mixing element 21c communicating with a hollow portion 24g, with the result that the fluids D3 and E3 are highly mixed.

As described above, in the mixing unit 1 according to the present embodiment, the second plate 4, the stacked member 2 and the first plate 3 may be stacked in this order in the direction in which the gas flows or, by contrast, the first plate 3, the stacked member 2 and the second plate 4 may be stacked in this order (see FIGS. 14 and 15(a) and 15(b)).

By freely selecting the number of the mixing elements 21b and 21c, it is easy to control the pressure drop of the mixing units 1d to 1f. For example, since the fluid D3 is obtained by adding the fluids E1 and E2 to the fluid D1, the flow rate of fluid flowing into the mixing unit 1f is larger than the flow rate of fluid flowing into the mixing unit 1d. In this case, by increasing the number of the mixing elements 21b and 21c of the mixing unit 1f more than the number of mixing elements of the mixing unit 1d, it is easy to decrease the pressure drop of the mixing unit 1f.

Instead of the mixing unit 1b according to the second embodiment of the mixing unit, the mixing unit 1a according to the first embodiment may be used.

The other parts of the configuration of and the other effects of the mixing units 1d to 1f according to the first embodiment of the reaction device are the same as those of the mixing unit 1a or 1b according to the embodiment of the mixing unit.

(Second Embodiment of the Reaction Device)

Figure 16A:
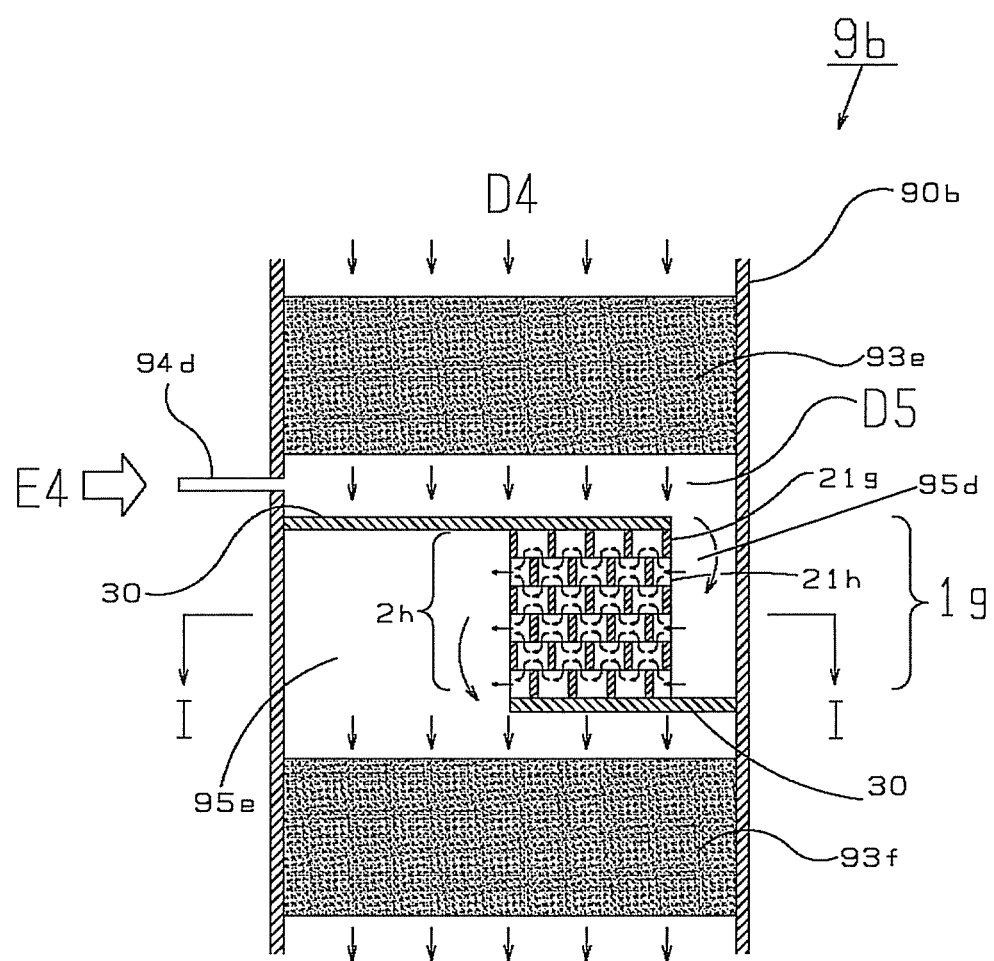
FIG. 16 A cross-sectional view showing how fluid flows into and out of a mixing unit according to a second embodiment of the reaction device.
FIG. 16(b) is a cross-sectional view taken along line I-I of FIG. 16(a).
Figure 16B:
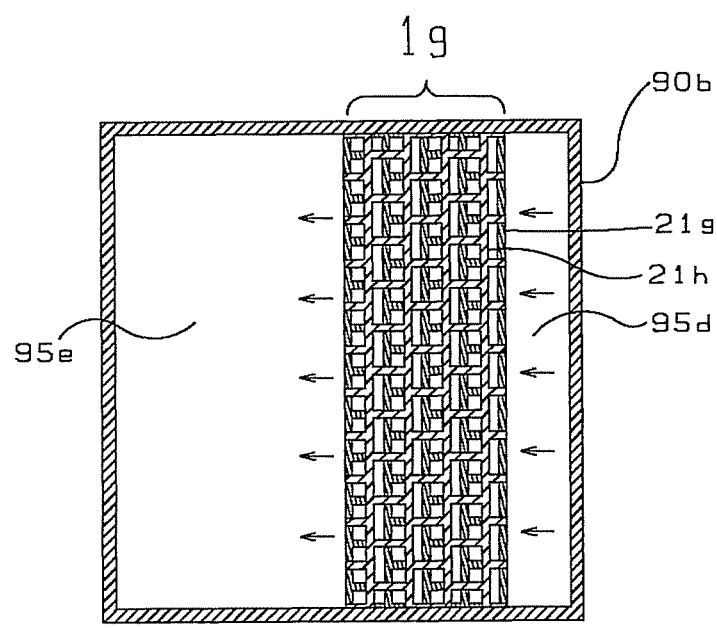

FIG. 16(a) is a cross-sectional view showing how the fluids D and E flow through a mixing unit 1g provided in a reaction device 9b according to a second embodiment of the reaction device; FIG. 16(b) is a cross-sectional view taken along line I-I of FIG. 16(a).

In the present embodiment, as the mixing elements 21 constituting the mixing unit 1g, a combination of a mixing element 21g with an outer frame 25 as shown in FIG. 7(b) and a mixing element 21h without the outer frame 25 can be used. Moreover, a combination of the mixing elements 21 shown in FIG. 7(b) and having different sizes can be used such that the first through holes 22 in the outer portion are open.

The mixing unit 1g is configured by sandwiching a stacked member 2h, in which the mixing elements 21g and 21h are stacked, between cover plates 30 with appropriate fixing means, and is further fixed within a vessel 90b with predetermined fixing means. The first through holes 22 in the mixing elements 21g and 21h on both ends of the stacked member 2h in the stacking direction are closed by the cover plates 30; both ends of the mixing elements 21g and 21h in the direction in which the mixing element 21g and 21h extends are closed by the vessel 90b such that an inlet and an outlet for the fluids D5 and E4 are provided. The first through holes 22 in the mixing elements 21g and 21h communicate with each other such that the fluids D5 and E4 are passed in the direction in which the mixing element 21 extends.

As described above, even in the mixing unit 1g, the fluids D5 and E4 flow into the stacked member 2h through the first through holes 22 in the mixing element 21h communicating with an outside space portion 95d, and repeatedly flow in and out between the first through holes 22 communicating with each other, with the result that the fluids D5 and E4 are mixed. Then, the fluids D5 and E4 flow out of the stacked member 2h through the first through holes 22 in the mixing element 21h communicating with an outside space portion 95e.

When, as seen in cross-sectional view, the mixing elements 21g and 21h are smaller than the vessel 90b, part of the side surface of the stacked member 2h may be covered by an appropriate plate or the like such that an inlet and an outlet for the fluids D5 and E4 are provided.

The other parts of the configuration of and the other effects of the mixing unit 1g according to the second embodiment of the reaction device are the same as those of the mixing units 1d to 1f according to the first embodiment of the mixing unit.

The embodiments disclosed above should be considered to be illustrative in all respects and not restrictive. The scope of the present invention is indicated not by the embodiments described above but by the scope of claims, and includes meaning equivalent to the scope of claims and all modifications and variations within the scope.

LIST OF REFERENCE SYMBOLS

| | |
|---|---|
| 1, 1a, 1b, 1c, 1d, 1e, 1f and 1g | Mixing unit |
| 2, 2a, 2b, 2c, 2d, 2e, 2f, 2g and 2h | Stacked member |
| 3 | First plate |
| 4 | Second plate |
| 5 | Mixing device |
| 6 | Agitation impeller |
| 7, 7a and 7b | Pump mixer |
| 9a and 9b | Reaction device |
| 21a, 21b, 21c, 21d, 21e, 21f, 21g and 21h | Mixing element |
| 22 | First through hole (of mixing element) |
| 23 | Second through hole (of mixing element) |
| 24, 24a, 24b, 24c, 24d, 24e, 24f and 24g | Hollow portion |
| 28, 28a and 28b | Annular space portion |
| 31 | Opening portion (of first plate) |
| 41 | Opening portion (of second plate) |
| 95a, 95b, 95c, 95d and 95e | Outside space portion |
| A, B, C, D and E | Fluid |

What is claimed is:

1. A mixing unit comprising:
   a stacked member in which three or more mixing elements are stacked; and
   a first plate and a second plate between which the stacked member is sandwiched and which are arranged opposite each other,
   wherein the three or more mixing elements are plate-shaped and each comprises a plurality of first through holes;
   wherein a direction in which the mixing elements are stacked extends from the first plate to the second plate through the stacked member;
   wherein a direction in which the mixing elements extend is perpendicular to the direction in which the mixing elements are stacked;
   wherein the second plate comprises an opening portion communicating with at least one of the first through holes in the mixing elements;
   wherein the mixing elements are arranged such that part or all of the first through holes in one of the mixing elements communicate with other first through holes in an adjacent mixing element; and
   wherein the mixing elements are arranged to form fluid paths to allow the fluid to be both divided and combined both in the direction in which the mixing elements extend and in the direction in which the mixing elements are stacked.

2. The mixing unit of claim 1,
   wherein the three or more mixing elements, the first plate and the second plate are fixed such that the mixing unit is capable of being disassembled into each of the three or more mixing elements, the first plate and the second plate.

3. The mixing unit of claim 1, wherein the three or more mixing elements, the first plate and the second plate are fixed such that each of the three or more mixing elements, the first plate and the second plate are capable of being individually divided.

4. The mixing unit of claim 1,
wherein the mixing elements have a plurality of second through holes larger than the first through holes and are arranged such that the second through hole communicate with each other in a direction in which the mixing elements are stacked so as to form a hollow portion in the stacked member, and the opening portion in the second plate communicates with at least one of the first through holes in the mixing elements through the hollow portion.

5. An agitation impeller having the mixing unit of claim 4 fitted to a rotation shaft that is driven to rotate.

6. A mixing method by using the agitation impeller of claim 5, the method comprising the steps of:
(a) flowing the fluid into the stacked member from the second through holes of the mixing elements by a rotation of the agitation impeller,
(b) passing the fluid through the first through holes communicating with each other within the stacked member from the inner circumferential portion to the outer circumferential portion, and
(c) discharging the fluid outward from the first through holes through an opening to the outer circumferential surface.

7. A pump mixer having the mixing unit of claim 4 provided within a casing, wherein the mixing unit is driven to rotate such that fluid sucked through a suction port provided in an end surface of the casing is passed into the mixing unit through the opening portion of the second plate of and the hollow portion of the mixing unit, is further passed out through an outer circumferential portion of the mixing unit and is discharged through a discharge port provided in the casing.

8. The pump mixer of claim 7,
wherein blades are provided in the outer circumferential portion of the mixing unit, and the blades are formed to face in a direction substantially perpendicular to the direction in which the mixing elements extend.

9. A mixing system comprising:
the pump mixer of claim 7; and
a fluid circulating line that extends from the discharge port to the suction port of the pump mixer.

10. A mixing method by using the pump mixer of claim 7, the method comprising the steps of:
(a) passing the fluid sucked through a suction port formed in an end surface of the casing into the mixing unit through the opening portion of the second plate of the mixing unit and the hollow portion of the mixing unit,
(b) passing the fluid through the first through holes communicating with each other within the stacked member from the inner circumferential portion to the outer circumferential portion, and
(c) passing the fluid out through an outer circumferential portion of the mixing unit and discharging the fluid through a discharge port provided in the casing.

11. A mixing device comprising:
the mixing unit of claim 4; and
a casing that accommodates the mixing unit and that has an inlet and an outlet,
wherein the first plate of the mixing unit has an outer shape smaller than an inner shape of the casing, the second plate of the mixing unit has an outer shape substantially equal to the inner shape of the casing and an outer surface of the second plate is substantially in contact with an inner surface of the casing.

12. A mixing device of claim 11:
wherein said mixing unit is comprised of said second plate, a first stacked member, said first plate, a second stacked member, and said second plate are stacked successively.

13. An agitation impeller having the mixing unit of claim 4 fitted to a rotation shaft that is driven to rotate,
wherein the first plate in said mixing unit has an opening portion to pass a fluid through said opening portion.

14. A pump mixer having the mixing unit of claim 4 provided within a casing; and the first plate in said mixing unit has an opening portion to pass a fluid through said opening portion,
wherein the mixing unit is driven to rotate such that fluid sucked through a suction port formed in an end surface of the casing is passed into the mixing unit through the opening portion of the first plate and the opening portion of the second plate and the hollow portion of the mixing unit, is further passed out through an outer circumferential portion of the mixing unit and is discharged through a discharge port provided in the casing.

15. A mixing method using the mixing unit of claim 4, the method comprising the steps of:
(a) flowing the fluid into the stacked member from the second through holes of the mixing elements,
(b) passing the fluid through the first through holes communicating with each other within the stacked member, and
(c) discharging the fluid outward from the first through holes through an opening to the outer circumferential surface of the mixing elements.

16. A mixing method by using the mixing unit of claim 4, the method comprising the steps of:
(a) flowing the fluid into the stacked member from the first through holes through an opening to the outer circumferential surface of the mixing elements,
(b) passing the fluid through the first through holes communicating with each other within the stacked member, and
(c) discharging the fluid outward from the second through holes of the mixing elements.

17. A mixing unit of claim 4, wherein each of the mixing elements comprises the second through hole larger than the first through holes.

18. A mixing device comprising:
the mixing unit of claim 1; and
a casing that accommodates the mixing unit and that has an inlet and an outlet,
wherein the first plate of the mixing unit has an outer shape smaller than an inner shape of the casing, the second plate of the mixing unit has an outer shape substantially equal to the inner shape of the casing and an outer surface of the second plate is substantially in contact with an inner surface of the casing.

19. A reaction device,
wherein the mixing unit of claim 1 is provided within a vessel having an inlet and an outlet, at least two catalyst layers are provided within the vessel and the mixing unit is provided in at least one space between the catalyst layers.

20. A mixing unit of claim 1, wherein the first plate comprises neither an inlet to allow the fluid to pass through into the mixing elements, nor an outlet to allow the fluid to pass through from the mixing elements.

21. A mixing unit of claim 1, wherein each of the three or more mixing elements is disposed adjacent to one another such that the fluid flowing through the mixing elements is only affected by the first through holes of the mixing elements as the fluid flows from one mixing element to the adjacent mixing element.

22. A mixing unit of claim 1, further comprising an opening that allows the fluid to be passed out of or passed into the mixing element in the direction that the mixing elements extend.

23. A reaction device,
wherein a mixing unit for mixing fluid within a vessel is provided; at least two catalyst layers are provided within the vessel;
the mixing unit is provided in at least one space between the catalyst layers;
the mixing unit includes a stacked member in which three or more mixing elements are stacked and cover plates between which the stacked member is sandwiched and which are arranged opposite each other;
wherein the three or more mixing elements are plate-shaped and each comprises a plurality of through holes;
wherein a direction in which the mixing elements are stacked extends from one of the cover plate to the other cover plate through the stacked member;
wherein a direction in which the mixing elements extend is perpendicular to the direction in which the mixing elements are stacked;
wherein the mixing elements are arranged such that part or all of the through holes in one of the mixing elements communicate with a through hole in an adjacent mixing element to allow fluid to be passed in a direction in which the mixing element extends; and
wherein part of a side surface of the stacked member is covered such that the mixing unit has a fluid inlet and a fluid outlet in the direction in which the mixing element extends; and
wherein the mixing elements are arranged to form fluid paths to allow the fluid to be both divided and combined both in the direction in which the mixing elements extend and in the direction in which the mixing elements are stacked.

24. A mixing unit comprising:
a stacked member in which three or more mixing elements are stacked; and
a first plate and a second plate between which the stacked member is sandwiched and which are arranged opposite each other,
wherein the mixing elements have a plurality of first through holes;
wherein the second plate has an opening portion communicating with at least one of the first through holes in the mixing elements;
wherein a plurality of first partitions formed by the first through holes are disposed so as to stand on one of the mixing elements;
wherein a plurality of second partitions formed by the second through holes are disposed so as to stand on another one of the mixing elements adjacent to the one of the mixing elements;
wherein the plurality of partitions are disposed so as to stand on the two mixing elements;
wherein part or all of the first and second partitions are arranged alternately with one another in the direction in which the mixing element extends;
wherein a fluid in a first through hole is passed to other first through holes in an adjacent mixing element;
wherein a fluid path allows the fluid to be divided and combined by the partitions in a direction in which the mixing elements are stacked; and
wherein
the opening portion is disposed as a fluid inlet and an outer circumferential portion of the said stacked member is disposed as a fluid outlet, or
an outer circumferential portion of the stacked member is disposed as a fluid inlet and the said opening portion is disposed as a fluid outlet.

* * * * *